United States Patent [19]

Schonberger

[11] 4,169,391
[45] Oct. 2, 1979

[54] VARIABLE SPEED TRANSMISSION

[75] Inventor: Abram Schonberger, 4608 E. Linebaugh, Tampa, Fla. 33617

[73] Assignees: Abram Schonberger, Tampa, Fla.; John L. Traina, Anniston, Ala.; Hugo Goodyear, Brandon, Fla.

[21] Appl. No.: 752,128

[22] Filed: Dec. 20, 1976

[51] Int. Cl.$^2$ .................... G01C 19/02; F16H 3/74
[52] U.S. Cl. ........................ 74/5 R; 74/751; 74/64; 74/5.7
[58] Field of Search ............... 74/5.43, 5.7, 5 R, 751, 74/64

[56] References Cited

U.S. PATENT DOCUMENTS

| | | | |
|---|---|---|---|
| 1,260,943 | 3/1918 | Riley | 74/64 |
| 1,382,372 | 6/1921 | MacFarlane et al. | 74/5.7 |
| 1,914,865 | 6/1933 | Rath | 74/751 |
| 1,982,636 | 12/1934 | Carlson | 74/5.7 X |
| 2,011,453 | 8/1935 | Moller | 74/5.7 |
| 2,031,286 | 2/1936 | Stern et al. | 74/751 |
| 2,088,834 | 8/1937 | Briggs | 74/64 X |
| 2,380,932 | 8/1945 | Bates | 74/5.43 X |
| 2,984,124 | 5/1961 | Keyser | 74/751 |
| 3,451,289 | 6/1969 | Edmonds et al. | 74/5.43 X |
| 3,851,545 | 12/1974 | Gumlich | 74/751 |

FOREIGN PATENT DOCUMENTS

| | | | |
|---|---|---|---|
| 582444 | 10/1924 | France | 74/64 |
| 617088 | 2/1927 | France | 74/751 |
| 811317 | 4/1937 | France | 74/751 |
| 595866 | 12/1947 | United Kingdom | 74/751 |

*Primary Examiner*—Samuel Scott
*Assistant Examiner*—Don E. Ferrell
*Attorney, Agent, or Firm*—Mason, Fenwick & Lawrence

[57] ABSTRACT

A gyroscopic type, infinitely variable, fully automatic, mechanical power transmission, speed changer, or torque converter capable of transmitting a wide range of output torques and automatically performing at the most appropriate input-to-output rotational speed ratio for the most efficient transmission of power in any given situation.

In its most basic design, it comprises a rotatable main frame, two identical and separate sub-frame members which are rotatably mounted within the main frame, four identical gyroscopic-type rotors which are coaxially spin-mounted in pairs within the sub-frames, and two stators, one for each sub-frame, with each stator circumferentially positioned around the sub-frame member.

Operationally, the rotors have radii of gyrations which are varied automatically in predetermined sequence in concert with the rotation of their sub-frame members. When the rotors are spinning and a precessional torque is applied from an input power source such as to impart contra-rotation to the sub-frames, the paired rotors will generate an effective output torque to the output shaft via the main frame.

7 Claims, 17 Drawing Figures

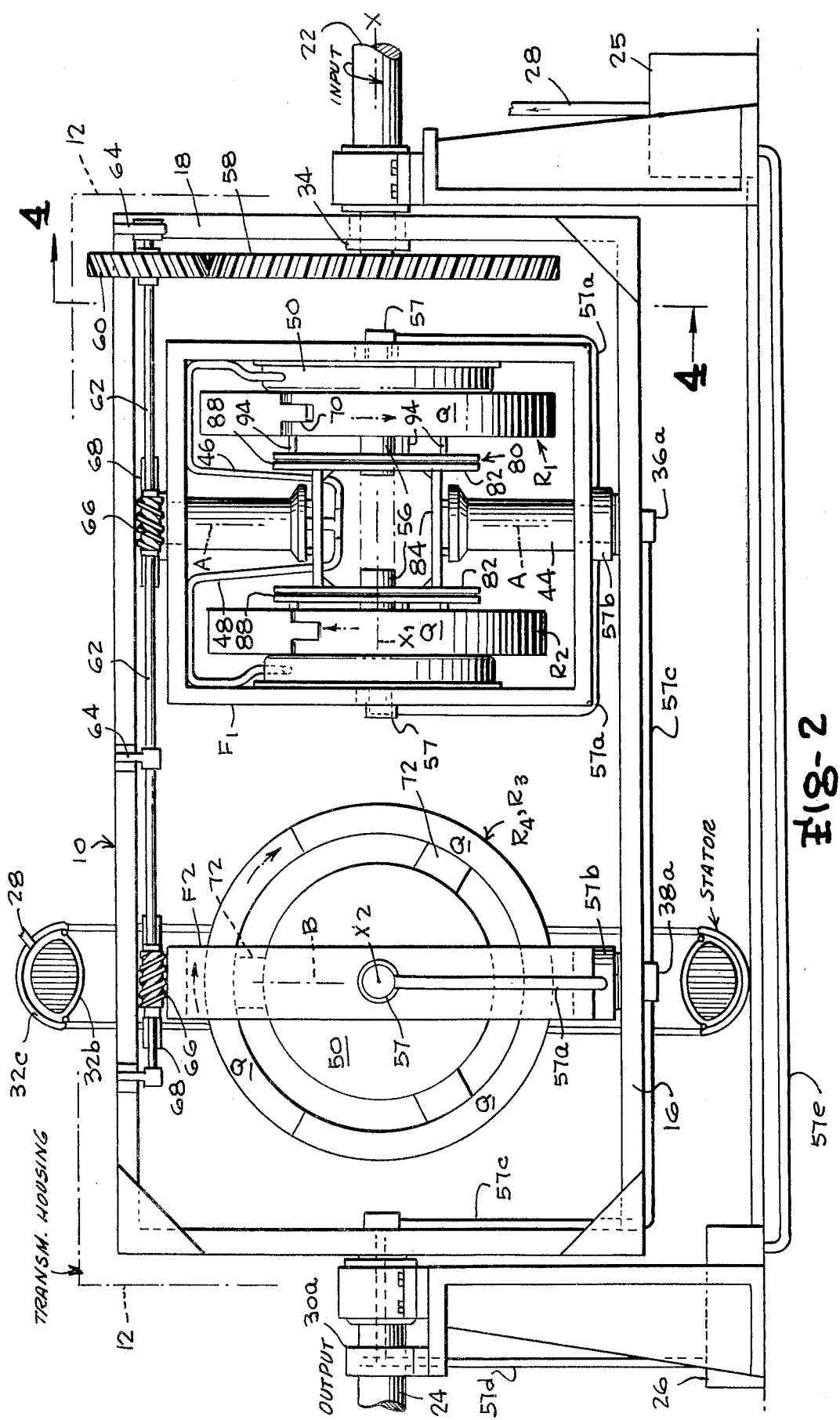

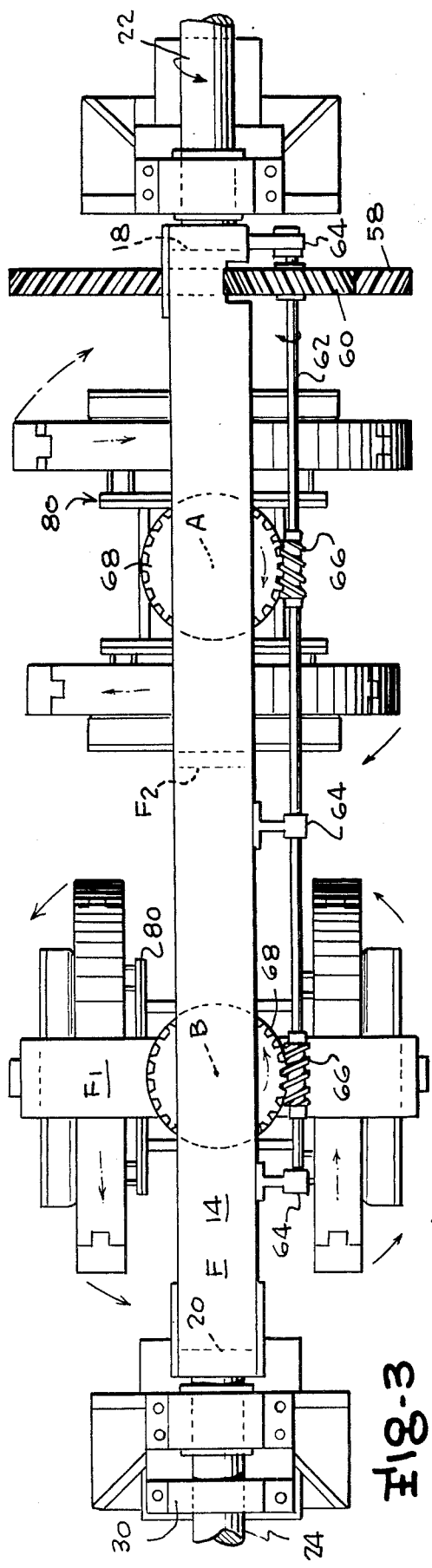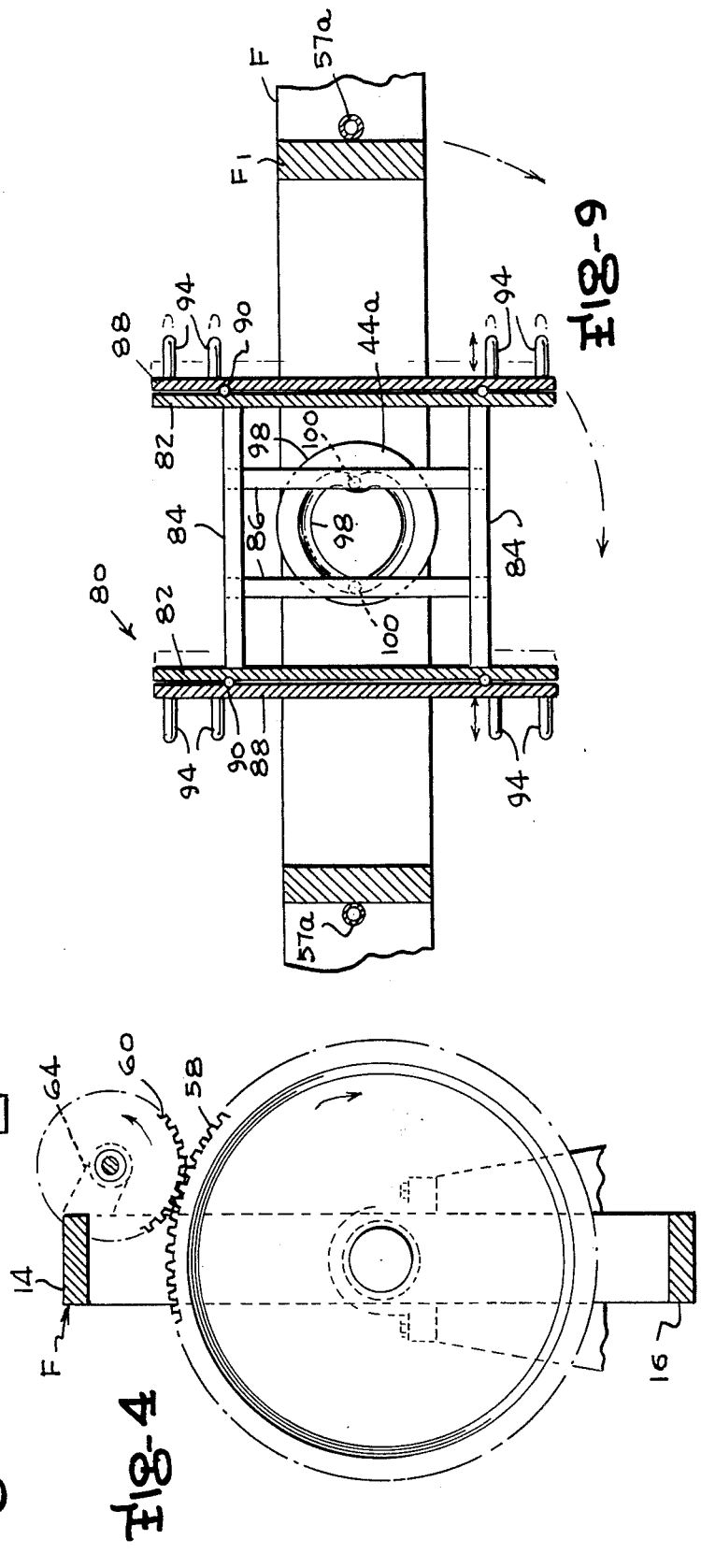

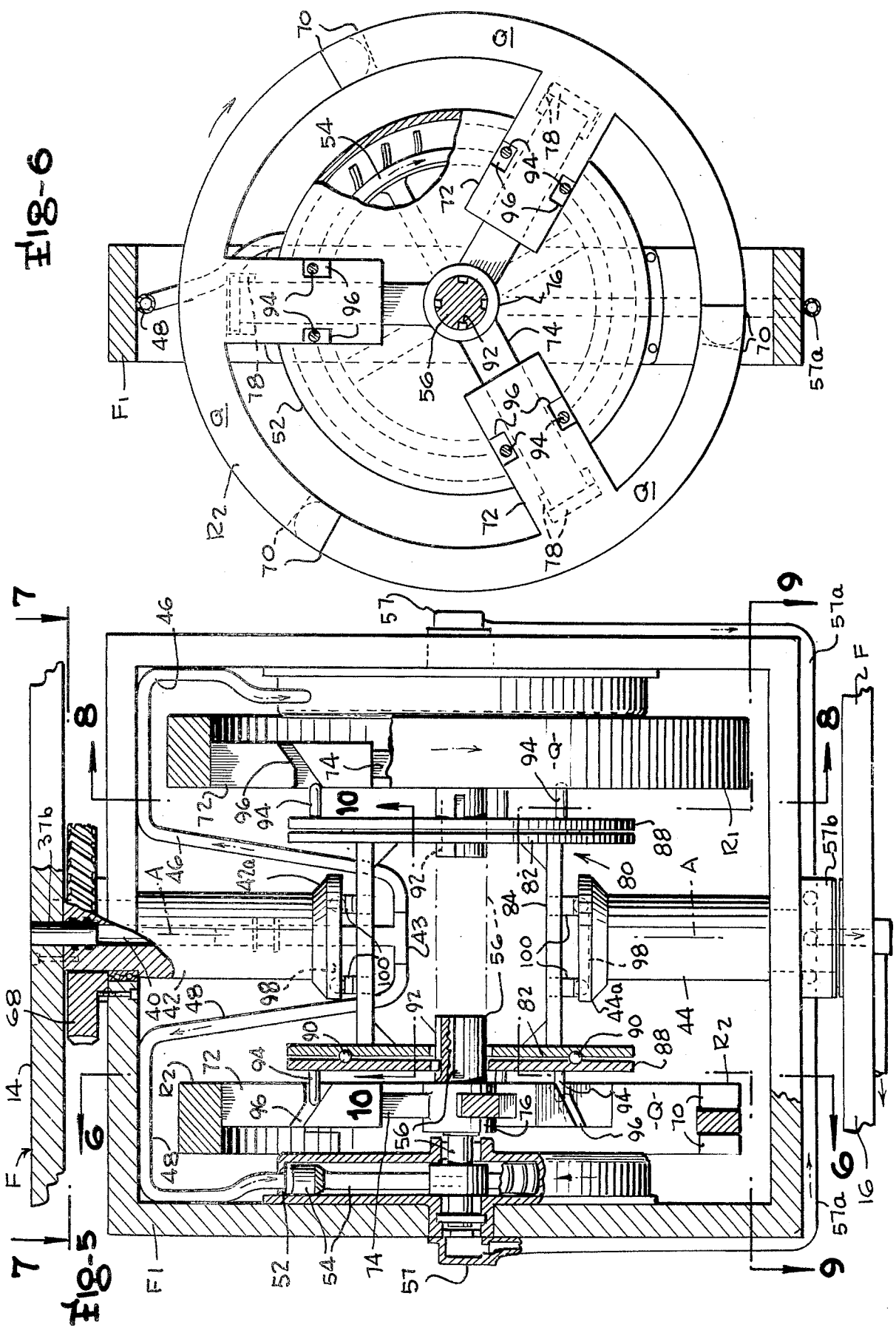

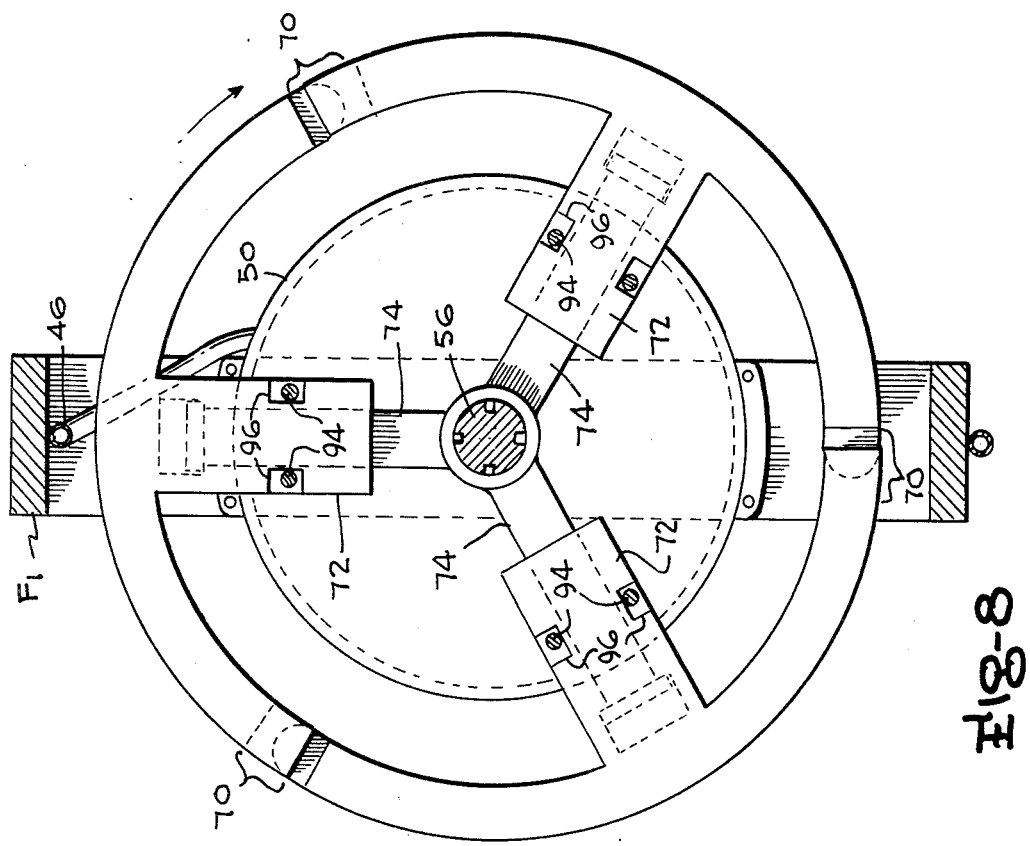
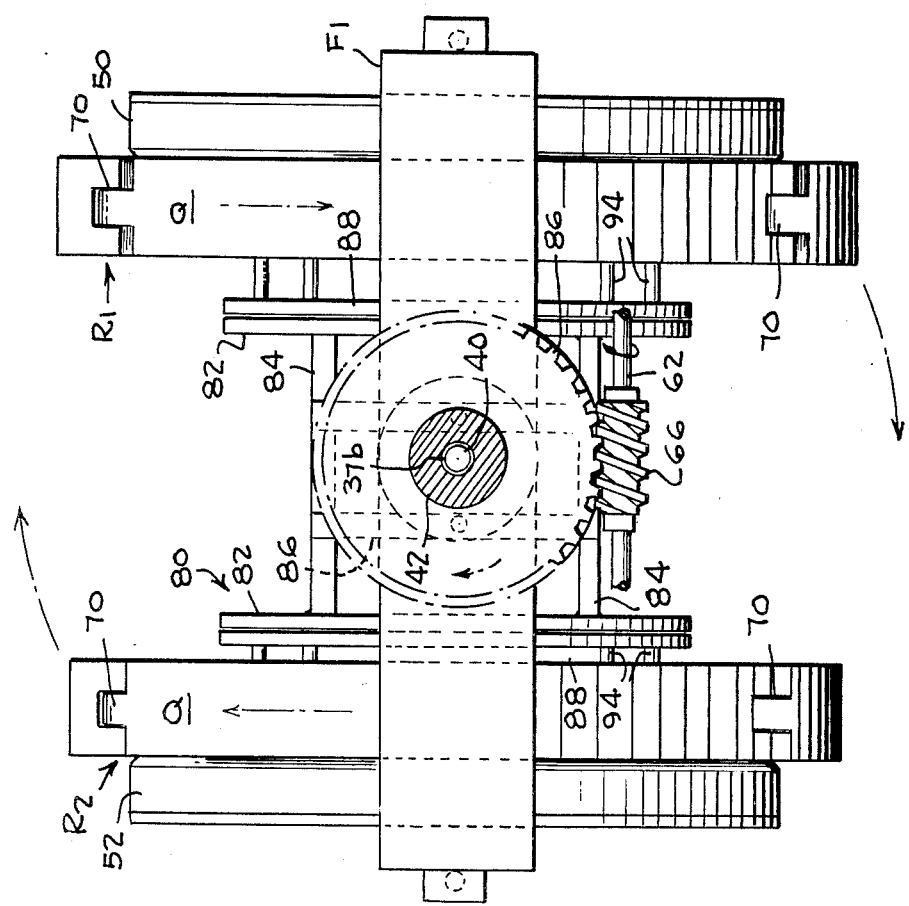

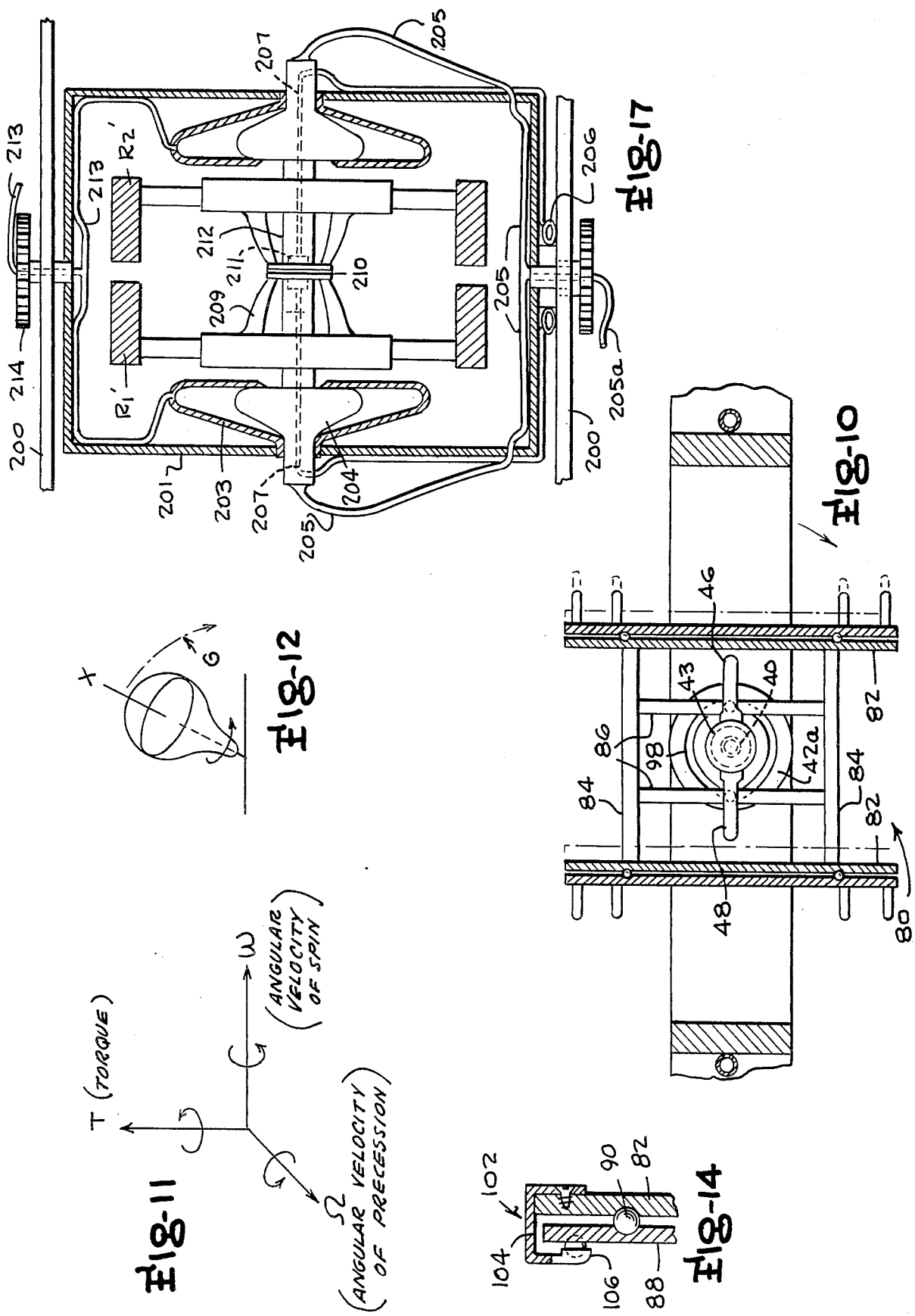

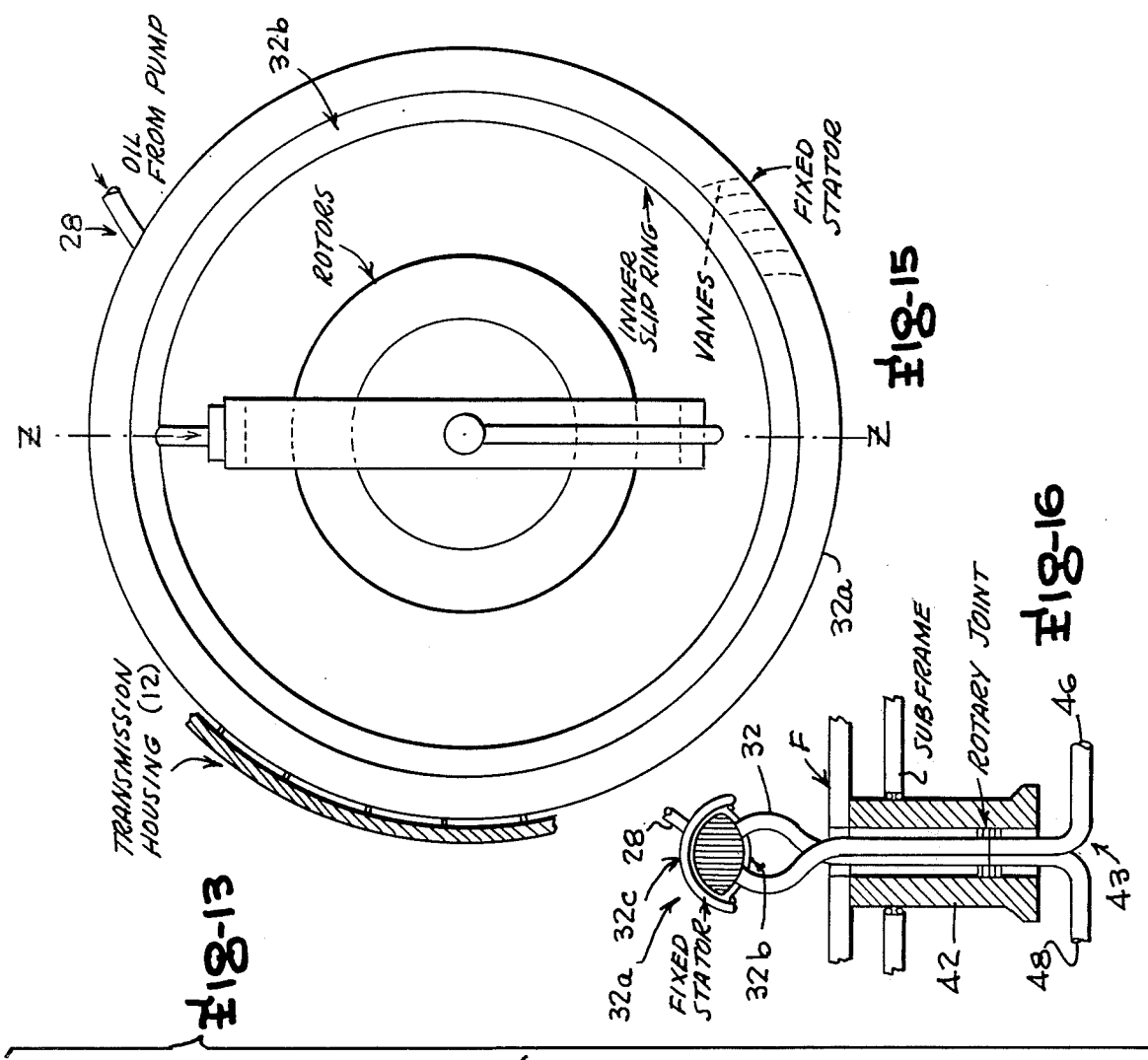
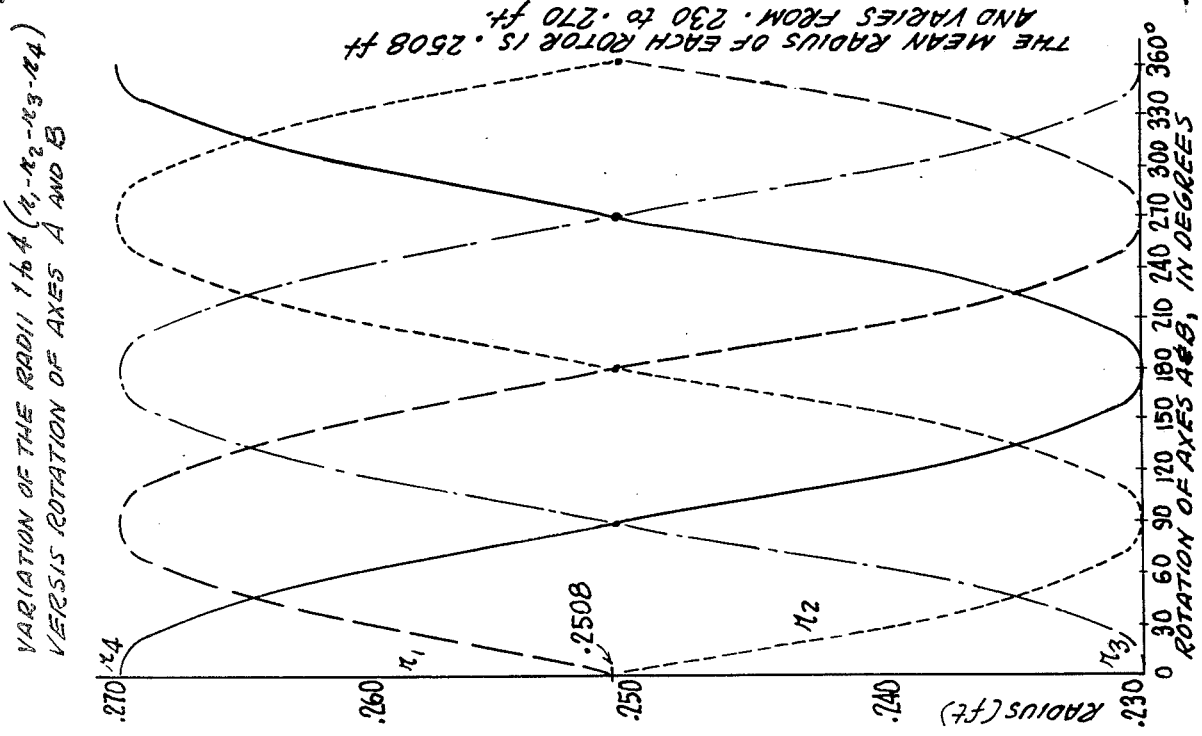

VARIABLE SPEED TRANSMISSION

BACKGROUND OF INVENTION

The present invention relates to a gyroscopic or rotor-type, infinitely variable, fully automatic, mechanical power transmission or speed changer of novel design employing the principles of gyroscopes or rotor dynamics as a means of torque conversion.

It will be shown that a rotor-type transmission has inherent capabilities for torque conversion approaching the theoretical ideal and unmatched by other systems utilizing gears, hydraulics, steam, or combinations thereof; and that, in terms of practical expectations, said inventive device is a close approximation to the theoretical ideal, to be discussed below. Other types of transmission systems, inclusive of those in current use, have been thoroughly explored and are known to have serious drawbacks. Even the electrical systems which do offer advantages in torque conversion over other conventional systems have the disadvantages of cost, complexity, and size, especially when space is a consideration. These limit their widespread use.

Excluding from consideration the small, special purpose transmissions which operate over a relatively narrow range of output power requirements, and the electrical systems which have their own specific types of limitations, automatic power transmissions in current use, not only operate at low mechanical efficiencies, but also perform poorly when operating over the full range of output power requirements for which they were designed. Generally, these transmissions operate relatively efficiently only at or near the output speeds corresponding to the several input-to-output rotational speed ratios designed into the device. In actual use, gross inefficiencies will result, not only from the operational demands for starts, stops, and accelerations, but also when operating at constant speeds at ratios other than those for which the transmission was specifically designed.

As a consequence of certain of the above limitations, current transmissions are generally equipped with devices such as a hydraulic torque converter which operates as a torque multiplier only for short periods of time—as a starting and accelerating device. Not only is the device highly inefficient mechanically, but also, it becomes so much dead-weight until again needed.

Much effort has been expended towards the development of an all-around better transmission—one that is more adaptable to wide ranges of use, is more flexible and efficient, and potentially less costly; but progress has been hampered by unacceptable compromises relatable to mechanical difficulties and increases in cost, cubature, weight, and complexity of operations. Although an infinitely variable transmission by purely hydraulic means has been realized, it proved impracticable because of high internal frictional losses and slow response to changes over the wide range of output power demands.

As a practical consideration, therefore, there is still a need for a fast response, less bulky transmission capable of delivering maximum power on the one hand, and operating efficiently and effectively through a wide range of power demands on the other, preferably by infinitely variable means other than by hydraulics. Thus as a minimum, and concomitant with the requirements for fast response, flexibility of operation and high mechanical efficiency, a theoretically ideal transmission should possess the following characteristics, said characteristics being generally identifiable with said inventive device:

(1) The capability for automatically transmitting a wide range of output power torques by infinitely variable means of input-to-output rotational speed ratios;

(2) The capability for delivering these output torques continuously and instantaneously, on demand, and always at the most appropriate input-to-output speed ratios relative to the output power needs, thereby ensuring power transmission at maximum efficiency and effectiveness;

(3) The capability for delivering output power torques over a wide range without the need for certain components and/or integral equipment such as bands, brakes, clutches, hydraulic torque converters, and special starters, some of these requiring periodic adjustment, frequent maintenance or replacement;

(4) The capability of transmitting extremely high horsepowers, achievable by high input-to-output speed ratios, with a transmission of nominal size and weight for the purpose of starting and moving extremely heavy vehicular loads such as heavy duty trucks, locomotives, and military conveyances inclusive of tracked vehicles and munition carriers;

(5) The capability for achieving the aforestated characteristics with an embodiment that is simpler in design, lighter in weight, smaller in cubature, and is less costly to manufacture than other automatic transmissions of comparable power ratings.

On occasions, the characteristics of the aforestated rotor-type transmission will be discussed in relationship to those of the automatic transmissions used in automobiles. This is done primarily for convenience and clarity because of the greater familiarity by all with this type of transmission. It should be understood that the application of the aforestated rotor-type transmission is not so limited. It should have almost universal application where speed changers and torque converters are needed.

Accordingly, it is a principal object of this invention to provide a novel, infinitely variable, fully automatic mechanical transmission utilizing the principles of rotor dynamics as a means of torque conversion.

Still another object is to provide a transmission of the aforestated character in which the input-to-output rotational speed ratio is automatically determined by its output power need, and therefore will always be operating at or near its most efficient ratio consistent with the input power. Efficiency under this basis would approximate the theoretical ideal. This presupposes nominal internal friction within the inventive device itself.

A further object is to provide a transmission of the aforestated character in which the upper range of ratios of input-to-output rotational speeds would be essentially unlimited for all practical purposes, and its speed changing and torque conversion characteristics would be independent of both the input rpm and the output rpm. Said unlimited range of ratios should permit transmittal of extremely high horsepowers with a transmission of nominal size and weight.

A further object is to provide a transmission of the foregoing character which, more than other types of transmission devices is adaptable to a wide variety of uses and output power needs. This will reduce to an absolute minimum the number of transmission types and sizes needed to satisfy all current and potential requirements.

A further object is to provide a transmission of the aforestated character that is operationally self-sufficient in terms of said transmission having the capability of delivering the full spectrum of output torques and horsepowers without the need for the special purpose, intermittently functioning, components or assemblies such as fluid torque converters, starters, and clutches.

A further object is to provide a transmission of the aforestated character, which in comparison with other similarly rated automatic transmissions will embody fewer major components, thus allowing for greater simplicity of design, and for greater cost economies in production and use.

A further object is to provide a transmission of the aforestated character, which in comparison with other similarly rated automatic transmissions is lighter in weight and smaller in cubature.

A further object is to provide a transmission of the aforestated character that will deliver effective torques continuously and instantly, on demand, consistent with the input power.

Yet another object is to provide a transmission which in comparison with other similarly rated automatic transmissions is less prone to periodic adjustment, high maintenance, or replacement of components.

BRIEF SUMMARY OF INVENTION

If a torque is applied to a spinning rotor in a plane at right angles to its axis of spin, the rotor will react to said applied torque by developing a torque of its own at right angles to both the spin axis of the rotor and the direction of the above mentioned original applied torque. Said spinning rotor, unless restrained, will rotate about an axis that is normal to both the spin axis and the axis of the applied torque. (See FIG. 11). Said rotation is called precession. When the original torque moves through an angle, all the work performed will be utilized in the precession of the rotor. As will be noted later, the moment of inertia of each individual rotor is made to change in a predetermined manner, and consequently, the angular momentum of each said rotor changes in a dependent manner. It is by the utilization of this principle in conjunction with the factor discussed immediately below that the hereinafter described inventive device achieves the aforestated objects.

The other factor, also relatable to rotor dynamics, and which is utilized to provide said inventive device with characteristics earlier identified with those of a theoretically ideal transmission, is the absence of any direct linkage between the input and output power shafts. This also permits said shafts to rotate independently of each other when conditions require it, and makes it virtually impossible for said inventive device to stall the engine. Further, said factors will obviate the need for certain components or assemblies such as clutches and hydraulic torque converters.

Accordingly, the aforestated objects are achievable by providing a device which in its most basic design embodies four identical rotors with variable radii of gyrations, mounted coaxially in pairs within separate but identical sub-frames, said sub-frames being mounted for contrarotation on separate and parallel rotational axes; and said sub-frames being mounted within a larger, rigid outer frame which is rotatable about the longitudinal axis of the said device, and said longitudinal axis being collinear to the power input axis in the simplest and most effective configuration.

Specific to the aforestated object which has applicability is efficiency, there are certain factual considerations relatable to rotor dynamics which make it possible for said inventive device to operate with minimal internal frictions. These are:

(1) The output distance moved is a function of the precession of the rotors, and since precession is considered a first order factor, it in itself does not create any internal friction;

(2) Excluding starts, but otherwise applicable to the full range of operating speeds, the distance the internal contact surfaces move per unit time is generally of a lower order of magnitude compared to the corresponding output movement per unit of time. In addition, the change of angular momentum of each rotor is effected by a very small change of its radius of gyration, because of the high spin-speeds of the rotors;

(3) The internal friction that does exist can be minimized and controlled to a much greater degree than is possible in present day hydraulic torque converters whose energy losses will always be abnormally high due to the turbulence and viscosity in the fluid; and (4) Finally, since output torque is derived directly from the precession of the paired rotors, for any given ratio of input-to-output rotational speeds and a constant output power demand, the spin-speed of the rotors will decrease as the speed of the output shaft is increased and, therefore, internal losses are further minimized. A further elaboration of this factor together with a mathematical example will be provided.

In the aforestated invention, two pairs of rotors are used, with each pair being coaxially mounted within a supporting structure, or sub-frame, so that each pair of rotors can rotate as a unit within its sub-frame. Each rotor of each pair is functionally linked with the other through a cam-coupling device, and each pair is mechanically linked to the other pair by rotationally mounting the two said sub-frames within a main frame, said two sub-frames being made to contrarotate at the same angular speed when in operation. Energy exchanges which are necessary in the change of angular momentum of each spinning rotor of a pair occur through a hydraulic system, preferably oil, with said cam-coupling acting as a timing and triggering device. The necessity for the energy exchange will be discussed later. In a steady-state operation, the sum of the spin energies of the two rotors of each pair as well as the angular speed of all rotors remain constant. Each pair of rotors in its sub-frame may have to be counterweighted for dynamic balance.

As noted above, the transfer of energy between any of the two paired rotors takes place through the medium of the hydraulic fluid. Although this is a steady state operation, and the total energy of the paired rotors is a constant, the fluid still exerts torque on both rotors of each pair. This increases the angular momentum of one rotor of a pair while decreasing that of the other of the same pair, and vice versa. As will be shown later by mathematics, and this can be readily affirmed by the use of the right hand rule (FIG. 11), the torques necessary either to increase or decrease the angular momentum of each of the four rotors are all directed in the same sense.

Since torque is a vector quantity, the fluid acquires a torque $T_1$ as a reaction to the torques on the rotors mentioned above; and further, since torque $T_1$ is of the same magnitude, but opposite in sense to the net torque generated by the precession of the rotors, it is necessary that torque $T_1$ be neutralized. This is readily accomplished by grounding out the unwanted torque $T_1$ to the body of the vehicle by means of stators, which will be discussed in greater detail later.

Three mutually orthogonal planes, XY, XZ, and YZ (FIG. 1) will be used in explaining and representing the device both structurally and mathematically. The plane XZ is coplanar with the main frame F and thus the axes A and B of sub-frames $F_1$ and $F_2$ lie on this plane. Plane XY is orthogonal to plane XZ so that the spin axes $X_1$ and $X_2$ of the rotor pairs lie on plane XY. This configuration makes the intersection of the two planes, coordinate line X, collinear with the longitudinal axis X—X of the said device. The third plane, YZ, is orthogonal to the other two planes, and is the plane in which the net effective output torque will be generated.

Each rotating sub-frame, with its pair of rotors spinning within, performs as a rotor also, and while rotating within the main frame about its subassembly axis, it will generate torques along the longitudinal axis. Therefore, the weights of each pair of rotors, along with any counter-weights at right angles to these rotors, which will be necessary for stability and for constant torque, become the dead-weights of a rotor rotating in the XY and XZ planes. Thus, the reason for the contrarotation of the two pairs of rotors: while one pair is generating a plus torque collinear with the longitudinal axis, the other pair is generating a negative torque collinear with the same axis, resulting in a net torque of zero along said longitudinal axis. The foregoing ensures performance of the transmission with negligible vibration.

In the present invention, the angular spin-speed of each rotor in a pair of rotors on its respective coaxial spin axis is fluid-pressure controlled, preferably by an oil hydraulic system. When said inventive device is in a steady-state operation, which is usually the case, the spin-speeds of all the rotors are constant and equal. But since the angular momentum of each rotor is changing, it is important that the external torque generated thereby in the YZ plane be neutralized by means of stators.

In view of the foregoing relative to the torque in the YZ plane and in the hereinafter mathematical proof showing constant torque from precession in the YZ plane and zero torques in the XY and XZ planes, it follows that total angular momentum in the XY and XZ planes must be a conservative property in steady-state.

The variation of the rotor radii is accomplished by mechanical means, but both the spinning of the rotors and ensuring that all four rotors will spin at identical speeds at any given time are accomplished by hydraulic means. Tracing the hydraulic lines shows two paths of travel: one a long path through the impeller exhaust and back to the pump, and the other, a local loop through the stator from one impeller to the other. Since the pairs of rotors are thus hydraulically coupled, as the radius of one rotor is shortened, resulting in a reduced moment of inertia, it will be under stress to speed up as the only means to conserve angular momentum, while as the radius of the other rotor is increased, the exact opposite ensues for the same reason. As a consequence, the centrifugal pressure becomes greater in the impeller of the rotor which is under stress to speed up and less in the other rotor which is under stress to slow down. Hence an equalization is constantly taking place between the two rotors of a pair since fluid under high pressure passes directly from one impeller to the other, i.e., the impeller on the rotor of shortened radius does work on the fluid, which in turn is forced into, and does work on, the impeller on the other rotor of lengthened radius. This keeps all rotors at the same speed through hydraulic balance, with the action taking place instantaneously, at high pressure, and with little fluid flow, resulting in low energy losses due to viscosity. However, during this process, the fluid must exert torques on the rotors, and thus acquires a torque which is counter to the net torque being generated by the precession of the rotors. This unwanted torque is neutralized by means of stators.

BRIEF DESCRIPTION OF DRAWINGS

The mechanism embodying features of the aforestated rotor-type transmission and some theoretical considerations related thereto are illustrated in the accompanying drawings. The foregoing and other objects and advantages to be further summarized, will become more apparent from a more detailed description taken in conjunction with the accompanying drawings forming a part of this application, in which:

FIG. 2 is a side elevational view of an illustrative transmission apparatus of this invention.

FIG. 3 is a top plan view of the transmission apparatus of FIG. 2, excluding the stator;

FIG. 4 is an elevational cross-sectional view taken on line 4—4 of FIG. 2;

FIG. 5 is an enlarged, partially elevational and partially cross-sectional view of the right hand set of rotor means depicted in FIG. 2;

FIG. 6 is a detailed view of certain components as viewed substantially on line 6—6 of FIG. 5, except that the segmented rotor weights are shown in their fully retracted condition;

FIG. 7 is a plan detail view taken on line 7—7 of FIG. 5;

FIG. 8 is an elevational detail taken on line 8—8 of FIG. 5, showing the segmented weights of the rotor in their radially extended condition;

FIG. 9 is a fragmentary, enlarged detail view taken substantially on line 9—9 of FIG. 5, showing a bridle connection between a pair of rotors, and also showing an illustrative eccentric arrangement for effecting alternating retraction and extension of the radially shiftable segmented rotor weights;

FIG. 10 is a further detail view similar to FIG. 9 but viewed in an opposite direction on the line 10—10 of FIG. 5, and more clearly showing a rotary connection between stationary and rotary fluid line components of the transmission;

FIG. 11 is a perspective view of a vector diagram illustrative of the precessing movements attendant a spinning rotor having a torque applied to its spin axis;

FIG. 12 is a further diagrammatic view used in conjunction with the explanation attendant FIG. 11;

FIG. 13 is a chart depicting variations of the radii of two pairs of rotors numbered R1-R2 and R3-R4, versus the rotation about the axes A and B of frames upon which rotors R3, R4 and R1, R2 are respectively mounted for precessing rotation;

FIG. 14 is a fragmentary detail side view of a part of the bridle means;

FIG. 15 is a schematic view of one stator affixed to the transmission housing;

FIG. 16 is a cross-sectional view along line 2—2 of FIG. 15 depicting the lead-in of the hydraulic oil lines from stator to the sub-frame; and FIG. 17 is a semi-diagrammatic cross-sectional view of an alternative embodiment.

DETAILED DESCRIPTION OF A PREFERRED EMBODIMENT

Figure 1:
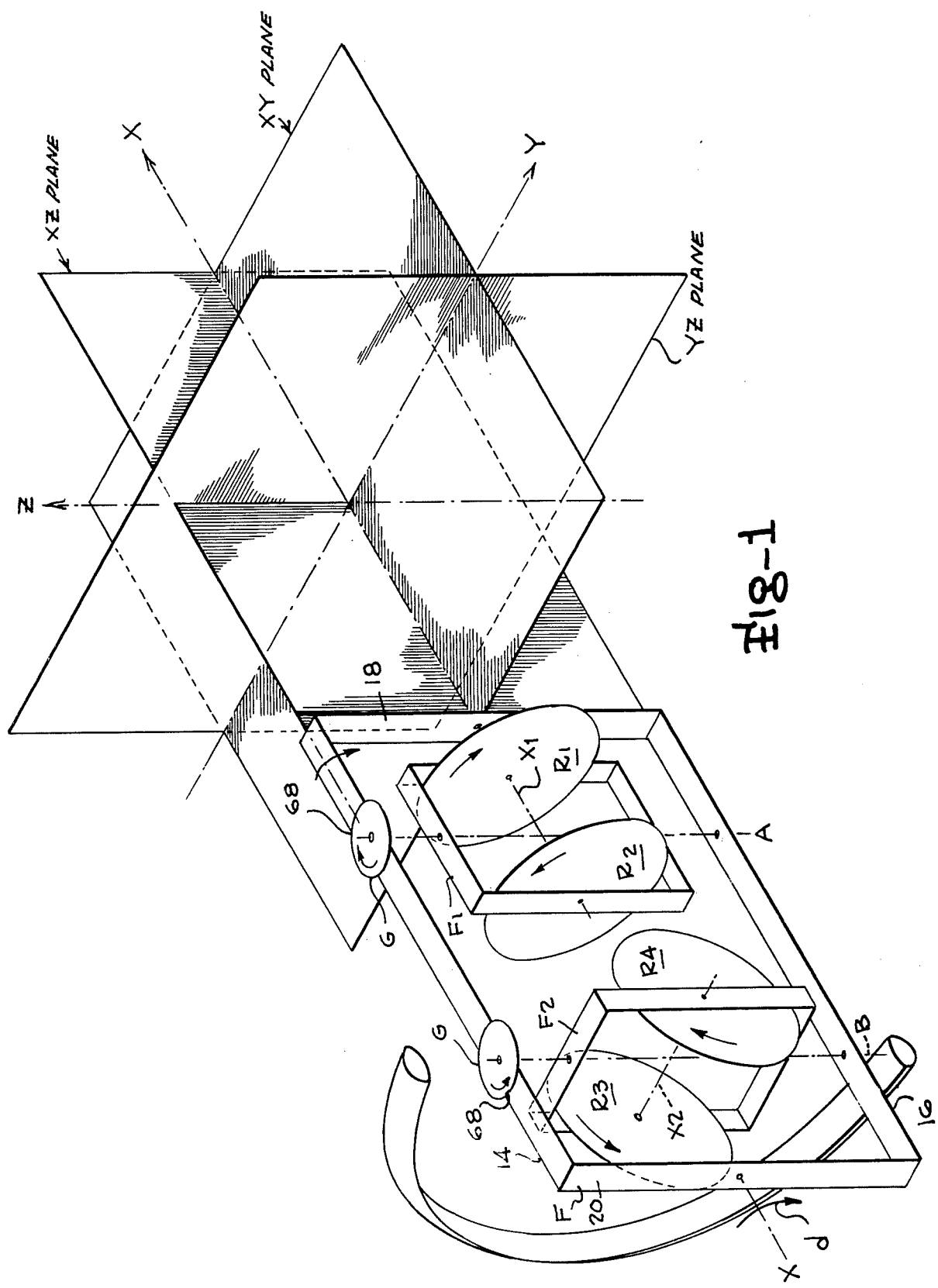
FIG. 1 is a perspective schematic view representing a simplified arrangement of the apparatus including the frame-supported four rotors, the three mutually orthogonal planes to which the mathematical theory is related, and one of two stators.

Referring to the drawings, the simplified schematic view of FIG. 1 shows an arrangement of the four rotors R1, R2, R3 and R4. The entire transmission assembly is generally denoted 10 and would be contained within a suitable housing 12, shown only fragmentarily and schematically in FIG. 2. The transmission assembly 10 comprises a rotor-supporting structure in the form of a rectangular rotatable main frame designated F, which may be of an elongated open character having a pair of opposed longitudinal frame members, of which 14 designates the top member in the illustrative figures, and 16 designates the corresponding lower frame member. Frame members 14 and 16 are interconnected by a shorter transverse frame member 18 at the input side, and a similar member 20 at the output side thereof. The member 18 of frame F is centrally mounted relative to a longitudinal centerline of and in a rotative manner with a suitable journaled rotary input shaft 22 connected with or constituting a part of a motor drive shaft (not otherwise shown); whereas frame member 20 of the supporting structure is solidly connected with a rotary output shaft 24 suitably journaled at support 30. The connection of frame member 18 at the input side is one enabling the input shaft to rotate freely thereto; whereas the connection of the F-frame member 20 at the output side is fixedly connected with the output shaft 24 so that torque rotation generated by the precession of the spinning and rotating rotors R1, R2, R3 and R4 will be imparted to the frame F, and consequently to the output shaft 24.

Additionally, frame F serves to support contrarotating sub-frames F1 and F2, in which the two pairs of rotors are housed. The rotors of one pair, within sub-frame F1 are designated R1 and R2, and are disposed to be rotated as a pair by means associated with the shaft or axis means A (FIGS. 1 and 2) so as to rotate as a unit about the shaft axis A, while spinning about their spin axis X1 at the same angular speed, but in spin directions opposite to each other as viewed from any point outside of the inventive device. The other two rotors, R3 and R4, mounted within sub-frame F2, rotate as a unit about axis B, but in the opposite sense as the other pair, R1 and R2, while also spinning about their common spin axis X2 at the same angular speed as R1 and R2, but in the opposite spin directions of the other rotor pair insofar as related positions of the sub-frames as they rotate is concerned. Note that in FIG. 1, as F1 rotates so that after a 90° turn rotor R1 occupies the same position relative to Frame F as shown for rotor R4 in the same figure, R1 and R4 spin opposite to each other. The same analysis holds for rotors R2 and R3. The means for effecting the spinning of the rotors and the precessing rotation of the respective pairs will be described hereinafter.

At all times, sub-frames F1 and F2 rotate at the same angular speed, but counter to each other, and all four rotors spin at the same angular speed in the senses described above. The four rotors are mounted to revolve in independent pairs R1-R2 and R3-R4. The sub-frames F1 and F2 are mounted within the main frame F so that, at some point during their rotation, while spin axis X1 is collinear with the longitudinal axis X—X (FIGS. 1 and 2), the spin axis X2 will be perpendicular to X1. This assures that the net precessional torque produced by one pair of rotors, as it varies from zero to some maximum value, is always 90° out of phase with the similar precessional torque produced by the other pair. As an aid in understanding the transmission device as well as the mathematics being set forth hereinafter in support of the theory, reference is made to the three mutually orthogonal planes previously described and shown in FIG. 1.

It is to be noted that the XZ plane of the frame F is a rotating plane which alternately becomes the XY and XZ planes of the frame F, and X—X, the intersection of the XY and XZ planes, is collinear with the longitudinal axis of the transmission device. The transmission produces a net torque T which is limited always to the YZ plane and is transverse to the longitudinal axis X—X.

Fluid pressure is utilized for the purpose of simultaneously imparting spin to all the rotors by means of a turbinelike wheel or impeller 54 fixedly attached to each rotor. The fluid pressure is derived from suitable means which may comprise one or more input pumps 25 and a pressure control valve 26 at the opposite ends of the transmission (FIG. 2). One of the preferred fluids is hydraulic oil. Pressure control valve 26 regulates the pressure drop between impeller intake and exhaust to thereby control impeller speeds. The fluid pressure may be controlled by a foot-actuated control such as an accelerator pedal, not shown. The hydraulic fluid is pumped under pressure by means of conduit 28 directly into the two stators, generally designated 32a (FIG. 15). The stators will be discussed in greater detail later. A double conduit, generally designated 32, is affixed to the inner slip-ring 32b of each stator (FIG. 16). The two conduits lead out of the slip-ring 32b, one from either side near the outer rims of said slip-ring, then one conduit enters the other by means of a leak-proof aperture: thus said conduits become concentric before entering through the frame F member 14, and thence at this point the outer conduit increases in diameter so that the cross-section areas of the flow in both conduits are equal. Thence the double conduit enters the hollow portion of the centrally interrupted fixed shaft means 42. The double conduits remain concentric to permit spinning of the sub-frames without disturbing the fluid flow. This is accomplished by means of a leak-proof rotary joint which is within the interrupted shaft member 42. At joint 43 (FIG. 5), the two conduits 46 and 48 separate again (FIG. 16) through a leak-proof aperture and then enter the two impeller housings 50 and 52 within sub-frame F1. The flow of the hydraulic fluid from the second stator to the components within sub-frame F2 is analogous.

The aforementioned identical stators, of which only two are utilized in said inventive basic design, are shown in FIGS. 15 and 16, and fragmentarily and schematically in FIGS. 1 and 2. Each stator, generally designated 32a is disposed circumferentially around the main frame F so that the plane of each stator is orthogonal to the longitudinal axis and coincident with the rotation axis of each of the respective subframes which said stator encircles. Further, each stator consists of two major components: a circular rigid outer ring 32c that is rigidly affixed to the interior of the transmission housing 12 for non-rotation; and an inner slip-ring 32b, also circular and rigid, which is affixed to the main frame F via the double conduit 32 for 360° rotation. Further, both said two components are quasi-semicircular in cross section, with the inner slip-ring opening outward, and the outer ring, which contains fixed vanes therein, opening inward towards the center; and both components engaged to each other along their outer rims in a leak-proof, slidable means so that the two components together comprise an integral unit which serves not only as a part of the overall hydraulic fluid system means, as heretofore described, but also, because of the fixed vanes contained therein, as the means neutralize unwanted torques, those acting orthogonal to the longitudinal axis of the inventive device. The necessity for the stator means is clearly indicated in the mathematics to be provided later.

In lieu of use of an axially projecting fitting 43, it is understood that other suitable means such as a transverse passageway in upper fixed shaft part 42 and an adjacently related rotary joint fitting can be used to conduct the fluid to the impeller housings 50 and 52. Also the shaft means 56 may be in the form of either a pair of coaxial stub shafts journaled in appropriate bearing means at opposite sides of the sub-frame F1, or a continuous shaft similarly mounted. The same type of mounting is used for the other set of rotors R3 and R4 in sub-frame F2.

The pressurized fluid is directed from the respective impeller housings via centrally disposed hub outlets and conduit connections designated 57, (FIGS. 2, 5 and 6). The conduit portions 57a leading therefrom are connected to a rotary joint fitting 57b on the lower portion of sub-frame F1. Fitting 57b permits relative rotation between the sub-frame F1 and the adjacent concentric portion of the lower shaft member 44 which is fixed to the main frame's lower member 16. The oil enters the fitting 57b and is suitably conducted as by annular internal groove and transverse passageway (not shown) into an axial passageway of the shaft portions 44 and then via return fittings 36 and 38. The oil is then returned via conduit 57c along the frame members 16 and 20 via further suitable rotary fitting means including fitting 30 and finally directed into return conduit 57d leading to the pressure regulator 26. A further conduit 57e exits the pressure regulator 26 and completes the return cycle of the oil to a reservoir associated with input pump 25 (Fig. 2).

The hub disposition for the outlet fittings 57 contributes to the requisite pressure drop of the fluid to perform work on the impellers and to provide rotor spin-speed control. This is explained as follows:

A basic energy equation in hydraulic dynamics is:

$$E = \Delta P \times V,$$

where E is energy, $\Delta P$ is the pressure drop and V is the volume of fluid moved within the distance the pressure drops. In the case of a centrifugal impeller, pressure from a pump forces fluid tangentially into the housing at the outer periphery of the impeller. Here the pressure due to centrifugal force is at a maximum. The pump pressure, of course, must be greater than the centrifugal pressure for the fluid to be forced into the housing. Since the housing is full of fluid, increasing the fluid pressure forces more fluid downward or radially toward the hub center of the impeller. As the fluid moves down the impeller blades it reaches smaller and smaller radii of spin rotation, hence its linear speed decreases and it gives up its kinetic energy to the impeller blades. The pressure of the fluid is now at reduced linear speed and pressure and the fluid then exhausts at this reduced speed and pressure at the hub of the impeller.

Each of the four rotors R1, R2, R3 and R4 is fixedly mounted to its impeller 54 and inwardly of its respectively latterally disposed impeller housing 50 or 52. Said four rotors are made to rotate in independent pairs about their rotation axes A and B in opposite directions within the two sub-frames F1 and F2, and on the XY plane, with the resulting net precessional torque always being in the YZ plane. Because the output position if fixed, neither pair of rotors can remain in proper phase to the input torque through a complete cycle. That is, the direction of precession of a rotor has a direct relationship to the input torque and the sense of rotation about the spin axis. As the precession continues about a fixed direction of input torque, the rotor will precess to a point where the direction of rotation about the spin axis is opposite to what it was at the beginning of the cycle. In order to maintain constant precession, it would be necessary to change either the sense of rotation of the rotor about its spin axis, which is not practicable, or to change the direction of the input torque. The latter, of course, would mean an oscillating input torque, which is also impracticable. However, by utilizing the two paired rotors, there is effected, in essence, a change of the rotational sense of an equivalent single rotor. Since the rotors hereof are not normally encountered, but are specially designed rotors, the foregoing accommodation can be made in a practical manner. This is essentially the basic problem that is hereby solved to obtain continuous power output from a fixed input power source by means of rotor dynamics. Accordingly, in order to achieve proper phasing and constant torque in a steady-state operation, the closely set air of rotors is provided with radially outwardly disposed weights which are capable of slight radial change so as to make their spinning moments of inertia variable and provide selective imbalance to achieve steady output torque. The following is a further clarification of this arrangement.

The input shaft 22 has an input drive gear 58 disposed on the end thereof inwardly of the frame member 18 (FIGS. 2 and 4). Input drive gear 58 meshes with a pinion gear 60, the latter of which is fixedly attached near one end of a drive shaft 62 mounted parallel to and generally coextensive with a major length of the upper frame member 14, (FIGS. 2, 3 and 4). Shaft 62 is journaled for rotation by any suitable support means such as a plurality of support arms 64, also depicted in FIGS. 2, 3 and 4. Shaft 62 has a pair of worm gears 66 fixedly mounted thereon in areas adjacent the central portion of each sub-frame F1 and F2 for mating cooperation with complemental worm pinion gears 68, which are affixed to said respective sub-frames F1 and F2. The threads of the respective sets of worm and related pinion gears are such as to impart the aforestated required contrarotation to said sub-frames F1 and F2 about axes A and B.

In order to vary the moment of inertia of the rotors during precession, it is necessary to vary the radius of gyration of each rotor by means of cam action. The interaction of the components involved in varying the moment of inertia is discussed in the paragraphs that follow.

Principally, each rotor consists of three equal sized, radially shiftable, arcuate sectors generally designated Q having the greater portions of their mass concentrated at the outer peripheral portions thereof. The three sectors are circumferentially slidably interleaved as depicted at 70, FIGS. 2, 5, 6, 7 and 8. To facilitate the radial shifting movement, each sector Q is provided with suitable spoke-like mounting means which comprise a centrally disposed sleeve-type arm 72 on each arcuate sector Q. The arms 72 are telescopically mounted on three corresponding equally spaced radial arms 74 emanating from the rotor's central hub 76 (FIGS. 6 and 8). The complemental arm and sleeve components 74 and 72, embody coacting means 78 (FIG. 6) to limit the relative telescopically radial movements thereof and to also preclude complete separation resulting from centrifugal force of the spinning rotors R1, R2, R3 and R4 about their spin axes.

A further part of the means to vary the moment of inertia of the rotors includes camming means to radially contract the rotor sectors Q which will normally tend to move radially outward and to expand circumferentially responsive to centrifugal force. This means may be in the form of an eccentrically oscillating bridle means generally designated 80 (FIGS. 5, 7 and 9), operatively interconnected with and disposed coaxially between each pair of rotors, R1, R2, and R3, R4. Bridle means 80, in one exemplary form, may comprise a spaced pair of members 82 rigidly interjoined in the axial direction by crossbracing means 84 and by further transverse cross-bracing means 86 (FIG. 9), all of which straddle the stud shaft means 56. A further pair of members 88 are respectively disposed outwardly adjacent the members 82 and suitably mounted to rotate with rotors R1 and R2 relative to said members 82. Anti-friction means 90 are provided intermediate the members 82 and 88, which latter members may be in the form of annular discs. The annular disc members 82 have center clearance openings to fit around the rotor shaft means 56. The other annular disc members 88 are considered camming members and are preferably provided at their axial centers with inner circumferentially spaced teeth to complementally slidably fit upon splined portions 92 (FIGS. 5 and 6) of the shaft means 56 to assure positive rotation with the rotors. This splined arrangement, together with the anti-friction means 90 which interrelates the adjacent members 82 and 88 as by ball type bearings seated in the raceways of each member assures basic properly related mounting of components 82 and 88.

Disc-camming members 88 are further provided with a plurality of camming pins 94 projecting transversely therefrom for cooperation with camming slots 96 provided in the sleeve members 72 of the rotor sectors, (FIGS. 5, 6 and 8). The laterally oscillating movement of the bridle means 80 (and adjacent camming members 88) is effected by suitable means, such as an eccentric cam track 98, provided in opposed end disc portions 42a and 44a of the sub-frame coaxial shaft portions 42 and 44 respectively. Cam tack follower means 100, of an anti-friction character, are fixedly attached to the transverse cross-bracing means 86 of the bridle members so as to cooperate with the eccentric cam track 98, (FIG. 9). By proper orientation of the eccentric track and all related bridle means components, it is apparent that with the rotors in motion, the position and relative lateral spacing of the rotors remain the same while the bridle and associated camming pins will move laterally to assure that the circumferential segments of each rotor will alternately be cammingly contracted against the pull of the centrifugal force to vary their inertia moments in correct predetermined sequence in accordance with preceding disclosure statements. The degree of radial shifting movements need only be relatively small as will be further exemplified hereinafter, and as represented in the chart of FIG. 13. The above discussion relating to the operation of the arcuate sectors Q of rotors R1 and R2 have similar applicability to rotors R3 and R4.

To assure and maintain a correct relative relationship between the annular disc members 82 and the camming discs 88, means generally denoted 102, as shown in FIG. 14, may be utilized. Means 102 may include a plurality of circumferentially disposed tie arms 104 having one end preferably fixedly connected to one disc member so as to operatively interconnect the disc members, with suitable anti-friction means 106 interposed between the physical contact made by the other free end of the tie arm 104 with the other disc member.

During the operation, as the pairs of spinning rotors revolve around their rotation axes A and B in the stated XY plane, each rotor moves from one side of the longitudinal axis X—X to the other. The rotors of each pair are made to spin oppositely about their spin axes X1 and X2 on the shaft means 56 (FIG. 2), and at the same angular speed. Using FIG. 1 as an illustration or example of directions of rotation for the spinning rotors and their precession-causing rotation direction on axes A and B, it will be seen that rotors R1 and R2 will be processing in direction coinciding with the longitudinal axis X—X and therefore there will not be an torque normal to the main frame F, but because the precessional torques generated by the two pairs of rotors R1, R2 and R3, R4 take turns performing in the same manner, each pair generating output torque which varies from a maximum to a minimum of zero, and vice versa, during a 90° rotation of the sub-frames, so that the combined output of the two pairs is a constant torque T to the output shaft 24, directionally indicated by d in FIG. 1. During the above-described process, the precessions generated by the paired rotors also have components in the XZ plane. It will be shown later mathmematically that the torques in the XZ plane can be made to cancel out by proper camming means. It then follows, that the torque resulting from the rotor precession is restricted to the YZ plane.

Earlier it was stated that the rotor spin-speeds decrease as output shaft speeds increase. This follows from the fact that the input torque is proportional to the product of the rotor spin-speed and its precessional rate. Since the output shaft is on the precessional side of the rotor complex, if the output shaft speed increases, the rotor spin-speeds must decrease proportionally in order to maintain a constant input torque.

The oil circulation rate through the rotor impellers decreases to a low value at steady state because the spin-speeds of the paired rotors about their spin axes remain totally unaffected by both the input torque and the procession of the rotors. Also, since energy losses due to friction are low, the fluid moving through the impellers, which is doing work on the rotors and tending to speed them up, need be just enough to make up for kinetic energy losses.

To further explain the feasibility and practicality of this novel transmission, a mathematical analysis follows. This will be accomplished by utilizing the three (3) orthogonal planes shown in FIG. 1, wherein plane XZ coincides with the plane of the main frame F, plane YZ is normal to main frame F and parallel to the rotation axes A and B, the plane XY is normal to the other two planes and has the spin axes X1 and X2 of the two (2) pairs of rotors coplanar therewith.

As part of the analysis, it will be shown why a gyroscope, because of its inherent ability to precess, develops a useful mechanical advantage. As is well known, when a spinning rotor is doing work precessing, the work accomplished can be expressed as a product of torque and angular displacement, or $$E = T \times \Delta\alpha$$

Since energy is conserved, it follows that $$T_i \times \Delta\theta = T_o \times \Delta\phi,$$

$T_i$ is a torque applied to a rotor along its spin axis,
$T_o$ is the precessional torque as a reaction to $T_i$, and
$\Delta\theta$ and $\Delta\phi$ are their respective angular displacements during the same interval of time. Then it follows that the mechanical advantage as a consequence of the precession is $$T_i/I_o = \Delta\phi/\Delta\theta.$$

Since in principal no restriction can be placed on the ratio $\Delta\phi/\Delta\theta$ by the physical properties of spinning rotors, it follows that a gyroscopic transmission, properly designed, should have the inherent potential of unlimited variability and range.

THEORY OF ROTOR DYNAMICS

When a torque is applied to the spin axis of a spinning rotor, the following relationship exists:

$$T = I\omega\Omega$$

where T = torque,
$\omega$ = angular velocity of rotor spin,
$\Omega$ = angular velocity of the precession, and
I = the moment of inertia of the rotor.

Except for the moment of inertia I, the other symbols represent vectors and thus can be related vectorially by the righthand rule as illustrated in FIGS. 11 and 12. The FIG. 11 vector relationship can be demonstrated by a spinning top depicted in FIG. 12. While the top is spinning counterclockwise, as viewed from above, if an applied torque here imposed by gravity represented by the arrow G, is acting so as to tend to make the top fall toward the right, then the top will react or precess by leaning into the plane of the paper. The X shown in FIG. 12 represents the tail of an arrow pointing into the paper. Correlating this to the aforedescribed device, when torque is applied to the spinning rotors, said rotors react by precessing, thereby generating an effective torque about the X—X axis. The input of power for the applied torque is transmitted to the rotors via the input shaft 22 and the gear train designated in the drawings by parts numbered 58, 60, 66 and 68.

Each spinning rotor will react in a plane of the spin axis A or B at right angles to the input torque by imposing a torque about its spin axis. Said imposed torque is, in turn, transmitted to the rotating axis A or B and thus to the main frame F, to which the output shaft 24 is connected.

Since the main frame F rotates only about the X—X axis, it is apparent that in the initial position of the rotors, as shown in the FIG. 1, only the rotor pair R3, R4 associated with axis A contributes effective torque to the frame F. Rotor pair R1, R2 will begin to contribute effective torque as it rotates away from its initial position where the aforestated angle $\phi = 0$.

In view of the foregoing descriptions and illustrative drawings, it is apparent that rotors R3 and R4 produce torques that are opposite to each other. Thus, if they are made to spin at exactly the same angular velocity, and have equal moments of inertia, the torques will exactly nullify each other. The same rationale applies to rotors R1 and R2. Therefore, it is necessary to have an imbalance in order to develop a net torque, which is achievable by varying either the spin velocities or the moments of inertia of the rotors. For the purpose of this disclosure, it will be assumed that varying the moment of inertia is the more practical approach, and the mathematical analysis that follows takes said assumption into account.

The following two basic equations applicable to rotor dynamics will be utilized:

$$T = I\omega\Omega, \text{ and}$$

$$I = mr^2,$$

where T = torque relating to output side due to precession of the rotor pairs;
I = moment of inertia of a rotor;
$\omega$ = angular speed of rotor spin, which is the same for all rotors;
$\Omega$ = angular speed of rotation of the rotor pairs due to torque imposed at the input side, equal for both axes A and B;
m = mass of a rotor; and
r = radius of gyration of a given rotor. This is essentially equal to the distance from center of the rotor to the center of the cross-section of the outer rim since most of the mass of the rotor is concentrated at the outer rim, as previously disclosed.

Considering torque T, let $T_{yz}$ and $T_{xz}$ be the torque in the YZ and XZ planes, respectively. There will be no torques in the XY plane. The main frame F knows no up or down and can only rotate about axis line X—X, and the three planes of reference rotate with it, keeping the same relative position. Since the axes A and B are always normal to the XY plane there can be no torques in this plane.

The only useful torques are seen in line to the YZ plane. Torques in the XZ plane will merely provide a longitudinal twist to the main frame F which is useless and not needed or wanted. Therefore, the condition is imposed that the torque of the XZ plane is always xzdefinition equal to zero, and representded as: $T_{xz} \equiv 0$. The following equations, based upon the geometry of the device, represent the adding of torques that lie in plane YZ, by using the relationships that apply to gyroscopes or anything that rotates in more than one plane.

$$T_{yz} = I_1 \omega\Omega \sin\phi + I_2 \omega\Omega \sin(180° + \phi) + I_4 \omega\Omega \sin(90° + \phi) + I_3 \omega\Omega \sin(270° + \phi) \quad (1)$$

which simplifies to $$T_{yz} = \omega\Omega(I_1 \sin\phi - I_2 \sin\phi + I_4 \cos\phi - I_3 \cos\phi), \quad (2)$$

or $$T_{yz} = \omega\Omega\{(I_1 - I_2)\sin\phi + (I_4 - I_3)\cos\phi\} \quad (3)$$

Similarly, adding the torques in the YZ plane, it follows:

$$T_{xz} = I_1\omega\Omega \cos\phi + I_2 \omega\Omega \cos(180° + \phi) + I_4 \omega\Omega \cos(90° + \phi) + I_3 \omega \Omega\cos(170° + \phi) \quad (4).$$

Simplifying and applying the imposition that $T_{xz} \equiv 0$, the following equation results:

$$I_1 - I_2 = \frac{(I_4 - I_3) \sin \phi}{\cos \phi} \qquad (5)$$

The discussion that follows indicates how to achieve the desired output torque by varying the radius of gyration. Reference is made to FIG. 13 which graphically exemplifies how the four rotors vary as the axes A and B rotate through 360°.

Substituting equation (5) in (3), then $$T_{yz} = \omega\Omega\left\{\frac{(I_4 - I_3) \sin^2 \phi}{\cos \phi} + (I_4 - I_3) \cos \phi\right\}, \text{ and} \qquad (6)$$

$$T_{yz} = \omega\Omega \frac{(I_4 - I_3)}{\cos \phi}. \qquad (7)$$

It is obvious that other than when the engine is stopped, or $\omega = 0$, $T_{yz}$ must be greater than zero. Therefore neither $(I_4 - I_3)/\cos \phi$ nor $\omega\Omega$ can equal zero.

It will be seen later that $I_4 - I_3$ can be made to vary so that the value is zero at the null points, when $\phi = 90°$ or 270°, but at those points the spin axis X2 of rotor pair R3, R4 is collinear with the longitudinal axis X—X and therefore no torque can be contributed by that rotor pair.

Next, imposing the restriction that the spin energy of one pair of rotors is equal to that of the other pair and that this quantity is invariant so long as $\omega$ does not changed, said equality can be expressed as $$E_{1,2} = E_{3,4},$$

where $E_{1,2}$ is the total spin-energy of the rotor pair R1, R1; and $E_{3,4}$ is the total spin-energy of the rotor pair R3, R4.

Further, the total spin-energy of any one rotor, say rotor R1, may be expressed as $$E_1 = \tfrac{1}{2} m r_1^2 \omega^2,$$

where the symbols are as before defined and $r_1$ = radius of gyration of rotor R1.

Note: The same equation is applicable to the total spin-energy of the rotors R2, R3, R4, except that for each specific rotor, the radius of gyration for that specific rotor applies, i.e. $r_2$, $r_3$, $r_4$.

Utilizing the equations above, the total spin-energy of rotor pair R3, R4 is $$E = \tfrac{1}{2} m \omega^2 (r_3^2 + r_4^2), \qquad (8)$$

or $$2E/\omega^2 = m(r_3^2 + r_4^2) \qquad (9).$$

Equation (7) can be rewritten as $$T_{yz} = \omega\Omega \frac{(mr_4^2 - mr_3^2)}{\cos \phi}, \text{ or} \qquad (10)$$

$$\frac{T_{yz} \cos \phi}{\omega \Omega} = m(r_4^2 - r_3^2).$$

Adding equations (9) and (10), the result is $$2 mr_4^2 = \frac{T_{yz} \cos \phi}{\omega \Omega} = \frac{2E}{\Omega^2} \qquad (11)$$

$$= \frac{T_{yz} \omega \cos \phi + 2E\Omega}{\omega^2 \Omega}, \text{ and}$$

$$r_4 = \frac{1}{\omega} \sqrt{\frac{T_{yz} \omega \cos \phi + 2E\Omega}{2m\Omega}}.$$

The value of $R_3$ may be similarly obtained by subtracting equation (9) from equation (10). In like fashion, the equations governing the values of $r_1$ and $r_2$ are obtained by solving equation (5) for $I_4 - I_3$ and substituting in equation (3).

From the foregoing, the values or r are summarized as follows:

$$r_1 = 1/\omega \sqrt{\frac{B+D}{C}}, \qquad (12)$$

$$r_2 = 1/\omega \sqrt{\frac{B-D}{C}}, \qquad (13)$$

$$r_3 = 1/\omega \sqrt{\frac{B-A}{C}} \text{ and} \qquad (14)$$

$$r_4 = 1/\omega \sqrt{\frac{A+B}{C}} \text{ where} \qquad (15)$$

$A = T_{yz}\omega \cos \phi$,
$B = 2E\Omega$,
$C = 2m\Omega$ and
$D = T_{yz}\omega \sin \theta$.

Equations (12), (13), (14) and (15) prescribe the design of the two cams, generally designated 80, FIGS. 2, 3, 5, 7, 9 and 10, whose functions have been heretofore described.

A similar mathematical treatment, but one in which the changes with respect to time of the moments of inertia of the rotors are summed, proves the need for the stators as means for neutralizing an unwanted torque that is generated in the hydraulic fluid.

An example of the contemplated effectiveness follows, in terms of capability of transmit power. It has been already stated that power (P) equals the product of torque (T) and angular speed ($\Omega$), or, $P = T\Omega$. As has been determined, the constant output torque $T_{yz}$ is equal to $(I_4 - I_3)\omega\Omega$ when $I_4$ is at a maximum and $I_3$ is at a minimum. $(I_4 - I_3)$ is equal to $(mr_4^2 - mr_3^2)$, where m is equal to the mass of each rotor. Therefore power is equal to $(mr_4^2 - mr_3^2)\omega\Omega\psi$ where $\omega$ is angular speed of the rotors, $\Omega$ is equal to the angular speed at which the rotors are rotated by the input shaft (engine), and $\psi$ is the angular speed of the output shaft. For said example, assume the following values:

m = 5 pounds (mass of each rotor);
$r_4$ = 0.33 feet (radius of gyration of one rotor at maximum);
$r_3$ = 0.30 feet (radius of gyration of other rotor at minimum);
$\omega$ = 1000 rpm = 104.7 radians per sec.;
$\Omega$ = 1000 rpm = 104.7 radians per sec.; and
$\psi$ = 1000 rpm = 104.7 radians per sec.

Note that the maximum difference in radii of gyrations between the two rotors is quite small, 0.03 ft., or slightly more than one-third inch. The angular speeds are deemed to be on the low side.

Substituting the above numerical values in the formula for power, P, and converting foot pounds per sec. to horsepower, HP, $P = (5/32.2)(0.33^2 - 0.3^2)(104.7)^3$, and
$P = 3368$ ft. lbs. per sec. = 6 HP (approx.).

Now if the angular speed of the rotor-spins is increased to 6000 rpm and the angular speed of the sub-frames to 6000 rpm by the engine, both being very reasonable figures, the power transmission value becomes about 220 Hp.

From the input data utilized, it is apparent that in comparison with other types of transmissions, a rotor-type mechanical power transmission will have a high power transmitting capacity per unit weight and size.

To facilitate numerical analyses, the above equation for power may be rewritten as $$P = 2mr (\Delta r) \omega \Omega \psi$$

where r is the average radius of gyration of the two rotors in a pair, and $\Delta r$ is the difference of their values when one is at maximum and the other at minimum. It is evident from the above equation, as well as from the parameters used in the previous example, that rotor-type transmissions of widely varying capacities for all conceivable applications are possible and that small changes in sizes and rotational speeds will result in large changes in HP rating.

Using the parameters of the previous example as a reference, which resulted in 220 HP, by increasing the size of the rotors in all dimensions by 50%, and consequently increasing their masses approximately 3 ⅜ times, and by doubling the $\Delta r$, say to .06 ft. (approximately ¾ inch), the capacity will be increased to near 2200 HP. This demonstrates the capability of said inventive devise to transmit high horsepower with a devise of nominal size and weight.

The matter of the spin-speeds of the rotors versus the precessional speed of the rotor sub-assemblies $F_1$ and $F_2$ (FIG. 1) will be discussed and exemplified hereinafter with reference to operation in a vehicle-mounted transmission. This concerns one of the most advantageous features of this rotor-type transmission. There are two important features regarding the rotation of the rotor sub-assemblies about axes A and B. First, it is related to the input speed, and secondly, it generates the precession which constitutes the output torque. The output motion is precessional relative to input side, and this motion takes place in the rotation of the main frame which is caused by the precessional torque of the rotors. With the engine running and the input shaft turning, as long as the vehicle is at rest, and hence the drive shaft is stationary, precession will be blocked. In this situation no work is being done, and although no resistance torque is felt by the engine, a torque is being generated on the output shaft. This is in accordance with the principle of conservation of energy. Consequently unlimited starting torque can be generated in the output side by accelerating the speed of the engine and/or the spin-speed of the rotors. In theory, very high mechanical advantages are achievable, depending on the starting resistance of the vehicle, which determines the engine speed and/or rotor spin-speeds required to just start the vehicle moving. For this reason, at stall (i.e., when the output shaft is not turning), the engine will have to be speed-regulated in order to prevent over-run and production of torques greater than are required or can be tolerated.

Once the vehicle begins to move (and the drive shaft, obviously, begins to turn), precession of the rotors begins, thereby generating a torque opposing the input from the engine. This means that work is now being done by the engine, pursuant to the principle of conservation of energy. Since the transmission is designed so that the output and input shafts turn in the same direction, when the speed of the drive shaft increases without a corresponding increase of the engine's rpm the rotation speed of the sub-frames must decrease. More importantly, if constant torque needs to be maintained, the spin-speeds of the rotors need to decrease, but not below the rotational speed of the output shaft.

As the rotational speed of the output shaft is increased, the rotational speed of the paired rotors (together with their sub-frames) is decreased and will eventually stop when the input-to-output speed ratio is one. Although the spin-speeds of the rotors will also decrease, enough spin will be maintained to keep the transmission turning in unison with the input and output shafts. Thus when the transmission is operating at a one-to-one ratio, since the sub-frames are not rotating, the internal friction losses of the transmission are at a minimum. The numerical values herewith provided in the following are in no way to be construed as approximating an upper limit or near maximum values. In theory, there are no limits on the size, weight and spin-speeds of the rotors, and on the precessional rate of the paired rotors at a given road speed.

In the following examples an output shaft speed of 3600 rpm, and an input torque ($T_i$) of 420 lbs-ft. are assumed. Using the same value for I as was used earlier in the numerical power example (where power=220 HP), and since $T_i = I \omega \psi$, where the symbols have the same meaning as hereinbefore, it follows that $$T_i = (5/32.2)(0.33^2 - 0.3^2)(3600)(0.1047)\omega = 420 \text{ lbs.-ft.,}$$

where the factor 0.1047 converts rpm to radians per sec. Note that the torque is relative to input since $\psi$ is angular speed of output and therefore is precessional to input. Now to transmit a torque of 420 lbs.-ft., it will be seen by solving the above equation that $\omega = 380$ rads. per sec., or 3625 rpm, approximately. It must be realized that although a torque of 420 lbs.-ft. is considered relatively large for an automobile, it is to be noted that the rotor spin-speeds required to transmit this torque have a modest value.

Next, a case of speed reduction through the transmission will be analyzed. Assuming some initial constant speed, and an input-to-output speed ratio of one, now suppose a hill is encountered and it is desired to keep the vehicle moving uphill at half the initial speed where the power requirement is the same as before, thus requiring a change in the speed reduction through the transmission to twice the original. With the engine operating a maximum torque, which with an ideal transmission would almost always be the case, the engine rpm is controlled by the load imposed upon it by the transmission. This means that the engine is turning at the slowest and most efficient possible rpm that will produce the required power. Only a controllable infinitely variable wide-range transmission meets these difficult requirements. The above-mentioned decreased speed (keeping the vehicle moving up the hill at half-speed) is met by allowing the output rpm to decrease while the engine rpm remains constant. This is accomplished by increasing the pressure drop between the fluid inlet to the impellers and the outlet pressure by actuating the pressure control valve in the hydraulic system with a conventional-type pedal. As a result, since equilibrium existed before, now the pressure downward through the impellers is greater than the centrifugal pressure generated by the impellers. As the fluid is forced down the impeller blades, work is done on the impellers causing them and their attached rotors to speed up. This is in accordance with the earlier explanation of impeller operation.

Considering the torque of, or "as sensed" by the engine is $I\psi\omega$ (symbols defined earlier), it is evident that increasing the pressure drop by releasing the pedal, as stated earlier, increases the torque resistance opposing the engine, but decreasing $\psi$ decreases the torque opposing the engine. This was shown in an earlier part of this Application. Since vehicle speed is now one-half its initial value and power requirement is the same as before with the engine at constant rpm and torque, the engine torque necessary to provide the output requirement equals $I\psi\omega$ and output torque is $I\omega\Omega$. Now by exemplary stipulation $\psi$ is one-half as great as before, so for the engine to "see" the same opposition, $\omega$ must be twice as great as before. The output torque "sees" $I\omega\Omega$ wherein $\Omega$ is proportional to engine rpm and this is unchanged. But $\omega$ is twice its previous value so the output torque has increased to twice its former value. Accordingly, the speed reduction through the transmission is now twice the previous value.

The foregoing agrees with the general statement for speed reduction by varying the spin-speed of the rotors as discussed earlier. That is, as road speed decreases ($\psi$ decreases), the rotor spin-speeds must increase proportionately so that the resultant torque delivered by the engine remains unchanged. Taking the values from the previous example, if $\psi$ is reduced to 2000 rpm, the rotor spin-speeds must increase to 6200 rpm for the engine to deliver the same torque. This is the situation of greatest internal motion in the transmission, and thus least efficient, but also where the least amount of operation time is spent. As for axes A and B, since this is the input side, the speeds thereof will be generally about engine speeds (1000–6000 rpm) while rotor spin-speeds will be from about 1000 to 8000 rpm. The above values depend on the axle ratio, which together with other factors, it chosen so that the rotor spin-speeds are always greater than the rotational speed of the output shaft.

Reference will be made briefly to alternate camming embodiment illustrated semi-schematically in FIG. 17. As can been seen, this embodiment is simpler in that it eliminates considerable portions of the camming mechanism between the rotors. While the various components or elements are shown in exaggerated spaced-apart relationship for clarity of illustration, it should be understood that a more compact design is visualized. To this end the impellers can be placed closely adjacent to the rotors in the hub area, and the depicted bridle can be reduced in lateral extent so as to protrude only the minimum amount needed to assure proper clearances.

The main frame 200 corresponds to main frame F of the aforedescribed embodiment in FIGS. 1–14. One of the rotary sub-frames is denoted 201 and corresponds to sub-frame F1 hereinabove. Sub-frame 201 supports the pair of rotors R1' and R2' corresponding to rotors R1 and R2 respectively. The impeller housing 203 encloses the rotary turbine-like impellers 204, and each has a hydraulic exhaust conduit 205 which corresponds to conduits 57a above, and which conduits 205 join and continue as conduit 205a, which corresponds to conduit line 57c above.

There are provided small hydraulic actuatable plungers 206 running on a disc member 206a having a curvilinear contoured outer periphery. The disc member 206a is mounted on the lower portion of the main frame 200.

This embodiment includes a relatively small diameter hydraulic line 207 which passes through the hollow hub of the impeller, rotor and shaft assembly, and operatively terminates in association with a hydraulically-actuatable cylinder and double-acting piston assembly 211 to actuate the bridle shiftable rotors R1' and R2'. To facilitate this, a suitable bridle and camming pin assembly is denoted at 209 and corresponds in general construction and purpose to that of the first-described form. Further, a stationary ball race plate 210 is provided centrally between the rotors R1' and R2'. A hollow shaft 212 is sleeved over the rotor stub shafts (the latter corresponding to shaft means 56 in the aforedescribed embodiment) and is splined and slotted so that the double-acting piston of the assembly 211, by means of outwardly extending fingers contacting the inner circumference of the ball race plate 210, will generate lateral shifting movement of the bridle and camming pin assembly 209 to thereby affect requisite rotor radii changes.

As shown in the mathematical analysis, it is to be noted that in each pair of rotors, the loss of rotational energy of the rotor whose radius is being shortened is exactly gained by the other rotor whose radius is being lengthened. Hence most of the stress and strain as a result of radii changes are transmitted through the ball race plate and bridle with the hydraulic shifting mechanism acting only as a triggering device. Therefore, the hydraulic shifting mechanism need have only a minimum of structural strength.

The hydraulic input to the impellers 207 is by way of conduits 213, which correspond to conduits 32 in the first-described embodiment. This modification also will include at least one and preferably a pair of input gears 214 which are rotatable with the rotatable sub-frames 201. These input gears correspond generally to gears 68 in the aforedescribed embodiment. It is apparent that the operating principle is the same as with the previously described embodiment.

From the foregoing it will be seen that the stated objectives and resultant advantages are achieved by this invention. Briefly, these may be summarized as the objectives of a transmission which will efficiently provide variable speed reduction throughout an extremely wide range of ratios and power requirements without the necessity for shifting gears, clutches and inefficient devices such as fluid torque converters as well as other components which sense when shifting to a different ratio is necessary, and other peripheral necessities.

In comparison to other existing automatic transmissions the present inventive device provides a mechanism for infinitely varying the input-to-output rotational speed ratios over a wide range, capable of transmitting a wide range of output torques automatically and always at the most efficient ratio for the most efficient transmission of power in any given situation; and will do so with a device that embodies fewer components, is simpler in construction, lighter in weight, and potentially less expensive to manufacture than existing automatic transmissions of comparable rating.

The foregoing advantages have very practical applications for any equipment particularly embodying the need of variable speed reduction, including numerous applications:

(1) As applicable to diesel locomotives it would eliminate the need for generating electricity to power the train, and would enable a diesel engine to start a heavy train from a rest position.

(2) As applicable to large diesel-powered trucks, or semis, it would eliminate the multiple manual gear shift mechanism.

(3) As applicable to automobiles, it would eliminate the fluid torque converter, provide a smoother ride by eliminating the need for shifting gears, except for reversing, and, above all, enable the engine to operate at its most efficient rpm.

While an illustrative and practical constructive disclosure has been made both structurally and mathematically, other variations and modifications may be made or proposed by those skilled in the art without departing from the spirit and scope as defined in the appended claims.

I claim:

1. An automatic, infinitely variable, mechanical power transmission embodying the principles of rotor dynamics, in its simplest form comprising:

(a) a main frame enclosed in a transmission housing, collinearly disposed on its longitudinal axis between the input power shaft and the output power shaft, said output shaft being rigidly affixed to the said main frame, and said input shaft being journalled relative to the structure of the said main frame for independent rotation of the said main frame;

(b) two identical sub-frames mounted on parallel, hollow, interrupted shafts rigidly affixed to the inner structure of the said main frame, said interrupted shafts disposed on axes orthogonal to the longitudinal axis of the said main frame, said input power shaft connected to the said sub-frames via a gear and worm train disposed longitudinally along the said main frame;

(c) four identical rotors coaxially mounted in operative pairs on stub axles, each said pair of rotors enclosed in one of the said sub-frames, said stub axles disposed on spinning axes which intersect orthogonally the rotation axes of the two said sub-frames, each said rotor consisting of a hub having three identical, equally spaced, sleeved radial arms and three identical, circumferentially separated, equally spaced, radially shiftable arcuate sectors, each said arcuate sector being the terminus of each said radial arm, the three said arcuate sectors of each rotor being mutually interleaved and containing most of the mass of each said rotor;

(d) four identical hydraulic impellers disposed in pairs within each said sub-frame, each said impeller coaxially mounted and integral with one of the said rotors, each said impeller being further disposed between its functionally associated rotor and the adjacent internal structure of its said subframe, and enclosed in an impeller housing rigidly affixed to the interior of its said sub frame; and all four said impellers being functionally a part of the overall hydraulic means;

(e) two identical toroidal stators disposed circumferentially about the said main frame on plane coincident with the rotation of the encompassed subframes and orthogonal to the longitudinal axis of the said main frame, each said stator comprising a fixed outer ring fitted with a rotatable inner slip ring, said outer ring having vanes disposed on its inner surface, and being rigidly affixed to the interior of the said transmission housing, and the said fitted inner slip ring being rigidly secured to the said main frame by a double conduit, said double conduit and said stator together comprising a link in the said hydraulic means;

(f) two identical camming means, each said camming means being functionally associated with one of the said sub-frames with its encompassed said pair of rotors and consisting of two identical eccentric cam tracks, a bridle, two annular discs, and two camming discs; said two eccentric cam tracks being affixed to the interrupted shafts of its associated said sub-frame; said bridle being disposed coaxially between the two said rotors of a pair and terminating in the two said annular discs, with center openings thereto to provide clearance for the stub axles of the said paired rotors, said two annular discs being disposed to operate against the two camming discs with ball bearings seated in raceways between them; said camming discs each having a plurality of camming pins projecting outwardly and engaging slidably with camming slots in the sleeves of the said arcuate sectors, and further, said camming discs being splined to said stub axles for common spinning with their respective said pair of rotors;

(g) a hydraulic means utilizing an incompressible fluid and consisting of the four said impellers, the two said stators, a pump, a pressure control valve, and interconnecting conduits; said pump and said pressure control valve being disposed externally of the said main frame, said conduits leading from the said pump along the inner surface of the transmission housing and connecting to the stators affixed thereto, said conduits continuing through the interrupted shafts of the said sub-frames along the inner periphery of the said sub-frames and tangentially into the impellers, with exit conduits from the hub area of the impellers affixed to the exterior of said sub-frames, exiting through the main frame through leak-proof rotary fittings affixed to the hollow, interrupted shafts between the sub-frame and the main frame to conduits affixed to the exterior of the main frame, thence engaging into the main frame and disposed transversely along the interior of the said main frame, and exiting the said main frame via an oil ring fitted to the said output power shaft and continuing to the pump via the said pressure control valve to complete the hydraulic circuit; and, (h) An infinitely variable torque conversion means utilizing the aforestated components and means in proper combination and disposition thereby to transmit a wide range of net torques to the output power shaft.

2. A mechanical power transmission as defined in claim 1 wherein the said hydraulic means of paragraph (g) include rotor-connected impellers, a pump, and fluid conduit means operatively connected with the said paired rotors of paragraph (c) to impart fluid pressure against the said rotor-connected impellers, and to circulate said fluid back through other portions of the said conduit means to said pump where said fluid is recirculated.

3. A mechanical power transmission as defined in claim 1 wherein the hydraulic means of paragraph (g) further include a pressure control valve operatively connected in the fluid flow circuit with said pump and fluid conduit means; said fluid circuit and said fluid conduit means comprising a conduit connecting said pump to each said stator, a double conduit exiting from the inner slip ring of each said stator, said two conduits becoming concentric upon entering said sub-frame through its hollow, interrupted shaft and fitted with leak-proof rotary joints within the hollow shaft to allow the doubled, concentric conduits to revolve with the sub-frame, then said two doubled concentric conduits separating again on emerging from said hollow shaft and each conduit thence disposed along the inside of the said sub-frames, and each conduit entering tangentially into the housing of each of the four said impellers, fluid from the conduits then entering each of said rotor-connected impellers and exiting through a leak-proof fitting at the hub of each impeller, thence conduits leading from the four impellers along the exterior of both sub-frames and into leak-proof rotary fittings on the hollow, interrupted shafts at a point between the sub-frames and the main frame, said fittings allowing fluid to flow from one impeller to the other in a sub-frame, thus said fluid flow from one impeller to the other of a pair in combination with the said stator and double conduits of each said associated sub-frame, establishing a "local loop" and also said fittings permitting fluid to exit the main frame into a conduit affixed to the exterior of the main frame, said conduit being disposed along the exterior of the main frame, and then re-entering the main frame through an aperture near the output end and being further disposed transversely along the interior of the said main frame, exiting the main frame via an oil ring fitted to the said output power shaft, thence a conduit leading to the pressure control valve, thence a conduit leading back to the hydraulic pump; said arrangement, which establishes the said "local loop", making possible necessary energy exchange directly from one rotor or a pair to the other by hydraulic energy flowing from one impeller to the other, and making possible a change of the angular speeds of all rotors simultaneously; and further, the aforesaid arrangement permitting the stators to ground out unwanted torques generated in the transmission by the said incompressible fluid reacting against the impellers;

4. A mechanical power transmission as defined in claim 1 wherein the said camming means of paragraph (f) include camming surfaces on each said weighted arcuate sector, and camming pins carried by said camming discs engageable with said camming surfaces.

5. A mechanical power transmission as defined in claim 1 wherein the said camming means include camming surfaces on said weighted arcuate sectors of each rotor, and camming pins carried by said camming discs engageable with said camming surfaces; and further, wherein said rotors each comprise a plurality of circumferentially separated, radially shiftable sectors having outwardly radially disposed uniform weight masses, said weight masses normally tending to move radially outward responsive to spin-induced centrifugal force, and wherein said means for effecting said varying of the radius of gyration include to identical camming means of paragraph (f), said eccentrics of each said camming means being oval-shaped to give the said bridle an oscillatory lateral movement, by which the said bridle acts upon the said camming discs through the said annular discs, a ball-bearing raceway separating the two annular discs from the two camming discs, said camming discs being provided with outwardly extending camming pins which engage slidably with camming slots in the sleeve members of said arcuate sectors, further said oval shaped eccentrics being fixed to the said interrupted shafts which are fixed to the main frame and therefore stationary with respect to the main frame, as a subframe frame rotates, the bridle is caused to oscillate laterally, causing the arcuate sectors of the rotors to move radially a small distance toward or away from the rotors' center so that when the sub-frame is orthogonal to the said longitudinal axis, the radius of gyration, as also the moment of inertia and the angular momentum, of one spinning rotor of a pair is at a minimum, the radius of gyration of the other spinning rotor of the said pair is at a maximum, and since the precessional torques generated by the two rotors of the said pair are unequal and opposed to each other, a net operational torque results; and further, as the sub-frame rotates to a point coincident with said longitudinal axis, the radius of gyrations of the two said rotors become equal and the net torque becomes zero; while further rotation of the sub-frame results in the radius of gyration of the aforesaid other rotor reaching a minimum while the radius of gyration of the first rotor reaches a maximum as the sub-frame again becomes orthogonal to the longitudinal axis of the main frame where the full operational torque is again reached; and further, the other sub-frame with its enclosed pair of rotors and camming means is generated a cycle of net torques which is identical to the cycle of net torques generated by the first aforementioned sub-frame with its enclosed rotors and camming means, but since the two said torque cycles are 90° out of phase with each other, said cycles combine and add to a constant output net torque; that is, while the net precessional torque generated by one pair of rotors varies sinusoidally from a maximum value to zero and back to maximum the net precessional torque generated by the other pair of rotors varies sinusoidally from a zero value to maximum and back to zero, the two said cycles of net torques adding to a constant net torque that is transmitted to the output power shaft.

6. A mechanical power transmission disposed between an input power shaft and an output power shaft, said transmission providing torque conversion and transmitting means through gyro-dynamic precission for infinitely varying the input-to-output rotational speed ratios over a wide range of output power requirements, said torque conversion and transmitting means comprising:

(a) a main frame disposed for rotation on its longitudinal axis between the input and output power shafts wherein the said shafts and said longitudinal axis are coaxial, said rotation being provided by the net effective torque developed by the precession of two pairs of spinning rotors with their varying moments of inertia in combination with two rotating subframes, said main frame being disposed for common and concurrent rotation with the rigidly affixed said output power shaft and for independent rotation with the journalled said input power shaft; and in combination, for providing the precessional means for transmitting an unlimited range of output torques, said transmission disposed to operate automatically over an infinite range of input-to-output rotational speed ratios;

(b) two said sub-frames disposed for full, contact-free rotation relative to each other on parallel, hollow, interrupted shaft, said rotation being achieved with power transmitted from a suitable power source to the said sub-frames via the input power shaft through a gear and worm drive, said subframes being further disposed so that the rotational speed of one sub-frame is always equal to and counter in direction to the rotational speed of the other sub-frame;

(c) four said rotors operatively associated in pairs, with camming means for varying their moments of inertia, coaxially paired for concurrent contra-spinning within the two said contra-rotating sub-frames, said sub-frames disposed so that the two angles made by the spin axes of the two said rotor pairs with the said longitudinal axis are always complementary to each other; and the two said pairs of rotors, in combination, being operatively phased to deliver to the output power shaft via the rotatable main frame, a constant torque; that is, while the net precessional torque developed by one said pair of rotors during one 180° rotation of its sub-frame is varying from a maximum value to zero and back to its maximum value, the precessional torque developed by the other said pair of rotors is concurrently varying from a zero value to maximum and back to its zero value, thus, in combination to deliver a constant torque on a continuous basis;

(d) a hydraulic means for imparting, maintaining, and varying as required, identical angular spin-speeds to the four rotors over a wide range, said hydraulic means utilizing four impellers disposed in pairs within each said sub-frame, each said impeller coaxially mounted and integral with one of the four said rotors for common spinning, said hydraulic means further utilizing two stators, a pump, a pressure control valve, and conduits to provide regulated and concurrent spin to the said four rotors such that the two rotors of each pair are contra-spinning, and similarly, the two rotors of one pair concurrently spinning opposite to their counterparts in the other said pair of rotors; in other words, the rotation of one said sub-frame and the spin of its enclosed rotors are a mirror image of the rotation of the other said sub-frame and the spin of its enclosed rotors;

(e) camming means which permit the necessary radial movements of the arcuate sectors of the said spinning rotors such as to achieve continuously and automatically a variation in the radii of gyrations of said rotors in mechanically predetermined sequence in concert with the rotation of the said sub-frames, thereby together with the rotation of the said sub-frames and the spin of the said rotors, generating precessional torque which are transmitted to the rotation axes of the said sub-frames, and to the said power output shaft via the said main frame; and, (f) a stator means for neutralizing the torques generated orthogonally to the longitudinal axis of the said transmission by the reaction of the hydraulic fluid against the vanes of the impellers which spin the rotors, said stator means being an integral, leak-proof link in the overall hydraulic means.

7. An automatic infinitely variable, gyroscopic type, mechanical power transmission within an transmission housing collinearly disposed on its longitudinal axis between the input power shaft and the output power shaft, said transmission comprising: (a) a rotatable main frame collinearly disposed on the said longitudinal axis between the said input and output power shafts, said input power shaft being journalled to rotate independently of the said main frame, and said output shaft being rigidly affixed to the said main frame for concurrent rotation with it; (b) two identical sub-frames rotatably mounted for full, contact free rotation relative to each other within the said main frame on parallel, hollow, interrupted shafts rigidly affixed to the inner structure of the said main frame and disposed on axes orthogonal to the said longitudinal axis; said sub-frames caused to rotate one opposite the other with power received from an external source transmitted to the said sub-frames via the input power shaft meshed to a gear and worm train disposed externally along the said main frame; (c) four identical rotors disposed for contra-spinning in operative pairs within the two said sub-frames on spin axes which intersect orthogonally the rotation axes of the said sub-frames; (d) hydraulic means utilized to impart spin to said rotors; (e) camming means utilized to vary the moments of inertia of the said four rotors; (f) said four rotors used operatively in conjunction with the said sub-frames and together with the aforesaid means therewith to utilize the contra-spinning of the paired rotors thereby to cause a gyrodynamic precessional torque to be developed in the said subframes, then transmitted to the rotatable main frame and thence to the output shaft; and further, with the continuously changing positions of the contrarotating sub-frames relative to the fixed positions of the said input and output power shafts, neither said pair of contra-spinning rotors can remain in proper phase to the output shaft through a complete cycle; that is, the direction of precession of a rotor has a direct relationship to its output torque, so that, as the precession continues, the rotor will precess to a point where the direction of rotation about the spin axis is opposite to what it was at the beginning of the cycle; and further, in order to maintain constant precession, both the two said paired rotors spinning oppositely to each other and the moments of inertia being varied by camming means in timed sequence, are utilized, thereby achieving in essence, a change of the rotational sense of an equivalent single rotor keeping in phase with the output torque; and consequently, in order to achieve proper phasing and constant torque in a steadystate operation, the closely set rotors in a pair in each sub-frame is provided with radially disposed arcuate sectors suitably weighted which are capable of slight radial change so as to make the spinning moments of inertia of the said rotors variable and provide selective imbalance to achieve steady output torque; and further, since one rotor of a pair is having its radius shortened as the other is having its radius lengthened, and this occurring as one rotor and then the other, in turn, crosses from one side to the other side of the said longitudinal axis, the resulting differences of angular momentum between the two said rotors of a pair in each sub-frame occur in said timed sequence; thereby to produce a net torque which is constant both in magnitude and direction.

* * * * *